(12) United States Patent
Nedberg et al.

(10) Patent No.: US 9,835,129 B2
(45) Date of Patent: Dec. 5, 2017

(54) HYDROELECTRIC POWER SYSTEMS AND RELATED METHODS

(71) Applicants: Brian A. Nedberg, Peoria, AZ (US); Gerald D. Hartford, Jr., San Diego, CA (US)

(72) Inventors: Brian A. Nedberg, Peoria, AZ (US); Gerald D. Hartford, Jr., San Diego, CA (US)

(*) Notice: Subject to any disclaimer, the term of this patent is extended or adjusted under 35 U.S.C. 154(b) by 0 days.

(21) Appl. No.: 14/872,394

(22) Filed: Oct. 1, 2015

(65) Prior Publication Data

US 2016/0201642 A1 Jul. 14, 2016

Related U.S. Application Data

(63) Continuation of application No. 14/597,107, filed on Jan. 14, 2015, now abandoned.

(51) Int. Cl.
| | |
|---|---|
| *B60L 11/12* | (2006.01) |
| *H02P 9/04* | (2006.01) |
| *F03B 17/00* | (2006.01) |
| *H02J 7/00* | (2006.01) |
| *H02J 7/35* | (2006.01) |
| *F01D 15/10* | (2006.01) |
| *F02C 6/00* | (2006.01) |

(Continued)

(52) U.S. Cl.
CPC .......... *F03B 17/005* (2013.01); *H02J 7/0068* (2013.01); *H02J 7/35* (2013.01); *H02J 2003/007* (2013.01); *H02J 2003/146* (2013.01); *Y10S 415/916* (2013.01)

(58) Field of Classification Search
CPC ........ H02K 7/1823; Y02E 10/28; Y02E 10/22
USPC ................... 290/43, 52, 50, 54, 55
See application file for complete search history.

(56) References Cited

U.S. PATENT DOCUMENTS

| | | | | |
|---|---|---|---|---|
| 4,109,160 A | * | 8/1978 | Goto | F03B 13/06 290/52 |
| 4,122,381 A | * | 10/1978 | Sturm | H02J 7/34 290/52 |

(Continued)

OTHER PUBLICATIONS

"Pumps—Types & Operation—Advantages & Disadvantages of Piston," http://articles.compressionjobs.com/articles/oilfield-101/3242-pumps-oil-gas-field-rotor-casing?start=16 (last visited Sep. 25, 2017).

(Continued)

*Primary Examiner* — Pedro J Cuevas
(74) *Attorney, Agent, or Firm* — Bryan Cave LLP

(57) ABSTRACT

Some embodiments include a system. The system includes a conduit system having a conduit system volume. The conduit system can convey a fluid through the conduit system volume of the conduit system. The system also includes at least one pumping mechanism operable to drive the fluid through the conduit system volume, at least one turbine operable to extract energy from the fluid conveyed by the conduit system and driven by the pumping mechanism(s), and at least one generator coupled to the turbine(s) and operable to generate electricity from the energy extracted by the turbine(s). The pumping mechanism(s) are configured to be powered by a first portion of the electricity and the system makes a second portion of the electricity available to one or more electrical loads. Other embodiments of related systems and methods are also disclosed.

20 Claims, 12 Drawing Sheets

(51) Int. Cl.
*H02J 3/00* (2006.01)
*H02J 3/14* (2006.01)

(56) References Cited

U.S. PATENT DOCUMENTS

| | | | |
|---|---|---|---|
| 4,176,283 A | | 11/1979 | McLaren |
| 4,698,516 A * | | 10/1987 | Thompson .............. F03B 13/06 290/54 |
| 6,051,892 A | | 4/2000 | Toal, Sr. |
| 6,420,794 B1 * | | 7/2002 | Cao ....................... F03B 17/005 290/43 |
| 6,472,768 B1 * | | 10/2002 | Sails ..................... F03B 17/061 290/54 |
| 6,798,080 B1 | | 9/2004 | Baarman et al. |
| 6,885,114 B2 | | 4/2005 | Baarman et al. |
| 7,233,078 B2 | | 6/2007 | Baarman et al. |
| 7,377,492 B2 * | | 5/2008 | Vrana ................. B01D 19/0042 261/29 |
| 7,663,257 B2 | | 2/2010 | Baarman et al. |
| 7,663,258 B2 | | 2/2010 | Baarman et al. |
| 7,675,188 B2 | | 3/2010 | Baarman et al. |
| 7,701,076 B2 | | 4/2010 | Baarman et al. |
| 7,768,147 B2 | | 8/2010 | Baarman et al. |
| 7,812,470 B2 | | 10/2010 | Baarman et al. |
| 7,932,618 B2 | | 4/2011 | Baarman et al. |
| 7,956,481 B2 | | 6/2011 | Baarman et al. |
| 8,008,796 B2 * | | 8/2011 | Muchow ................ E03B 11/12 290/43 |
| 8,106,527 B1 | | 1/2012 | Carr |
| 8,188,609 B2 | | 5/2012 | Baarman et al. |
| 8,400,007 B2 | | 3/2013 | Campbell |
| 8,546,965 B2 | | 10/2013 | Alvarez et al. |
| 8,669,671 B2 * | | 3/2014 | Efraty ..................... F03D 7/048 290/55 |
| 9,739,268 B2 * | | 8/2017 | Christensen .............. F03G 7/00 |
| 2003/0167760 A1 | | 9/2003 | Jackson |
| 2008/0246282 A1 | | 10/2008 | Hathaway et al. |
| 2009/0008943 A1 | | 1/2009 | Kemper |
| 2010/0308591 A1 | | 12/2010 | Godfrey |
| 2010/0320772 A1 * | | 12/2010 | Efratyi ................... F03D 7/048 290/55 |
| 2011/0025068 A1 * | | 2/2011 | Campbell ............... F03B 13/06 290/52 |
| 2011/0233935 A1 | | 9/2011 | Baarman et al. |
| 2012/0086204 A1 | | 4/2012 | Ré |
| 2012/0160350 A1 | | 6/2012 | Crugnale |
| 2012/0187691 A1 | | 7/2012 | Shaban et al. |
| 2012/0200088 A1 | | 8/2012 | Harris |
| 2013/0028729 A1 * | | 1/2013 | Jones .................... F03B 17/061 415/221 |
| 2013/0307272 A1 | | 11/2013 | Smith |
| 2015/0001141 A1 * | | 1/2015 | Wieland ................ E04H 4/1209 210/167.1 |
| 2015/0318763 A1 * | | 11/2015 | Kubota .................... F01K 27/02 290/52 |
| 2017/0167228 A1 * | | 6/2017 | Maughan ................ E21B 43/00 |
| 2017/0252714 A1 * | | 9/2017 | Bennett ............... B01F 13/1027 |

OTHER PUBLICATIONS

"Different Types of Pumps—Positive Displacement Pumps," Process Industry Forum, http://www.processindustryforum.com/article/different-types-pumps-positive-displacement-pumps (last visited Sep. 25, 2017).
Bosch—Engineering Data, https://dc-us.resource.bosch.com/media/us/products_13/product_groups_1/industrial_hydraulics_5/pdfs_4/9535233077.pdf (last visited Sep. 25, 2017).
Rexroth Bosch Group, "Fixed Displacement Radial Piston Pump," https://dc-us.resource.bosch.com/media/us/products_13/product_groups_1/industrial_hydraulics_5/pdfs_4/re11263.pdf (last visited Sep. 25, 2017).
Rexroth Bosch Group, "Hagglunds MB: Radial Piston Hydraulic Motor," http://www.olagorta.com/Radial_MB.pdf (last visited Sep. 25, 2017).
Rexroth Bosch Group, "Ocean Energy," https://www.boschrexroth.com/en/us/industries/machinery-applications-and-engineering/renewable-energies/ocean-energy/index (last visited Sep. 25, 2017).
Rexroth Bosch Group, "Wind Energy," https://www.boschrexroth.com/en/xc/industries/machinery-applications-and-engineering/renewable-energies/wind-energy/wind-energy (last visited Sep. 25, 2017).
Rexroth Bosch Group, "GoTo North America Focused Delivery Program Hydraulics," https://dc-us.resource.bosch.com/media/us/products_13/product_groups_1/goto_products/goto_documentation/USH00011_web.pdf (last visited Sep. 25, 2017).
Headquarters, United States Army Material Command, "Engineering Design Handbook: Hydraulic Fluids," AMC Pamphlet No. 706-123, 2-18 (Apr. 15, 1971).
Headquarters, United States Department of the Army, "Hydraulics FM5-499," (Mar. 31, 1997).
A. Bruce & J. Jones, "Tidal Energy System for On-Shore Power Generation," Marine & Hydrokinetic Technology Readiness Initiative DE-EE0003636 (Jun. 26, 2012).
W. Durfee et al., "Fluid Power System Dynamics," Center for Compact and Efficient Fluid Power, University of Minnesota (Sep. 25, 2015).
Peter J. Klete, "Fluid Power Systems," American Technical Publishers, p. 105-140 (2010).

* cited by examiner

HYDROELECTRIC POWER SYSTEMS AND RELATED METHODS

CROSS-REFERENCE TO RELATED APPLICATIONS

This application claims the benefit of U.S. Non-Provisional patent application Ser. No. 14/597,107, filed Jan. 14, 2015. U.S. Non-Provisional patent application Ser. No. 14/597,107 is incorporated herein by reference in its entirety.

FIELD OF THE INVENTION

This invention relates generally to electric power systems, and relates more particularly to hydroelectric or water power systems configured to generate and make available electricity to one or more electric loads and related methods.

DESCRIPTION OF THE BACKGROUND

Growth in world populations and increased use by those populations of electronic devices raises demand and need for electricity. Further, while continuing technological advancements may increase the sophistication and capability of electronic devices, these technological advancements often also increase the electricity consumed by the electronic devices. Many systems and methods exist for generating and making available electricity, but many aspects of existing systems and methods for generating and making available electricity are undesirable. For example, existing systems and methods for generating and/or making available electricity (i) can be costly to build, operate, and/or maintain, (ii) can require large surface footprints, (iii) can produce toxic and/or polluting by-products, and/or (iv) can be dangerous and/or technically challenging to operate, etc. Meanwhile, there is a continuing need for systems and methods for generating and/or making available electricity to populations located remotely from existing electrical infrastructure (e.g., electrical grids).

Accordingly, cheaper, smaller, cleaner, safer, and/or smarter systems and methods for generating and making available electricity in on-grid and/or off-grid applications are needed.

BRIEF DESCRIPTION OF THE DRAWINGS

To facilitate further description of the embodiments, the following drawings are provided in which.

Figure 1:
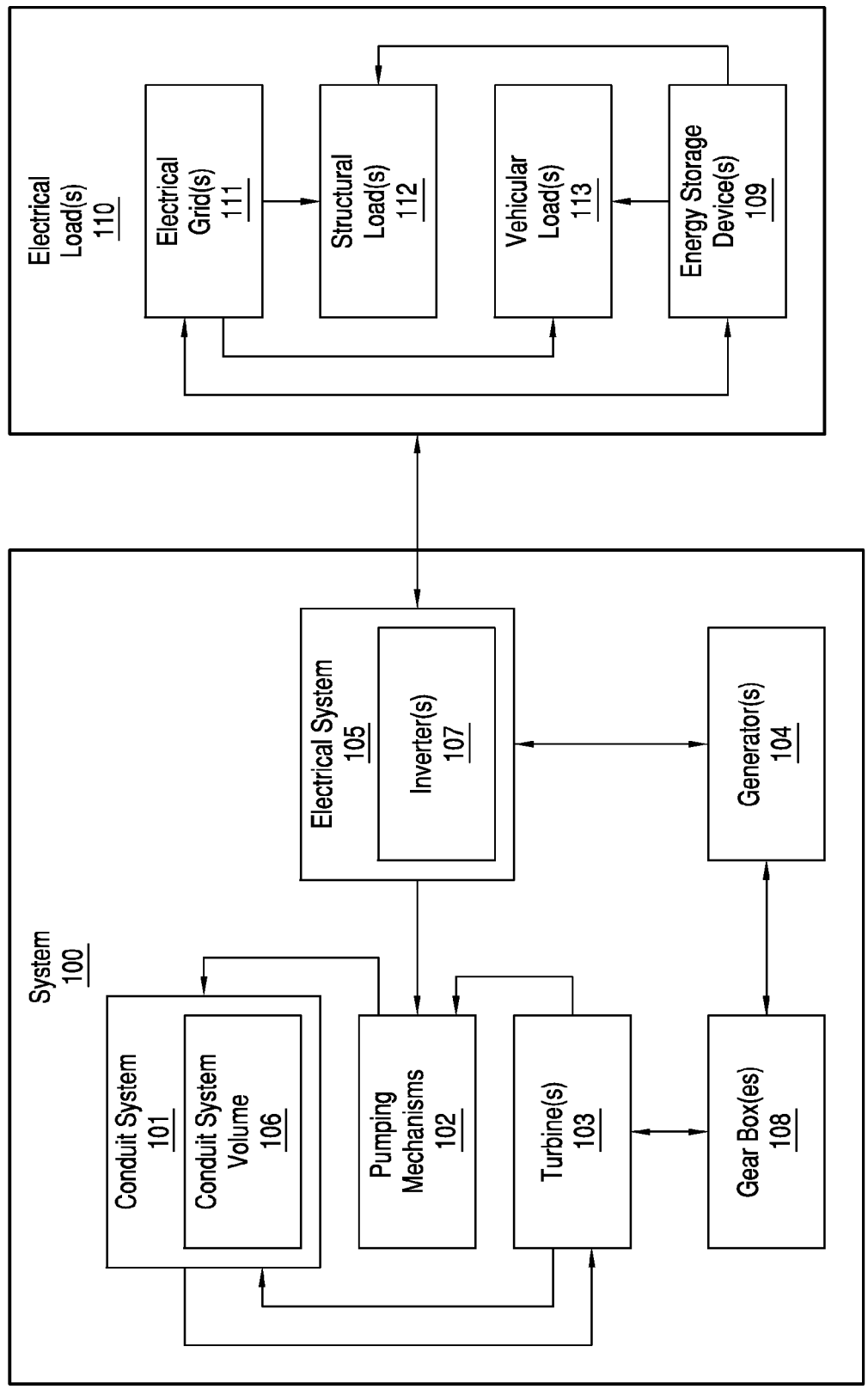
FIG. 1 illustrates a representative block diagram of a system, according to an embodiment.

For simplicity and clarity of illustration, the drawing figures illustrate the general manner of construction, and descriptions and details of well-known features and techniques may be omitted to avoid unnecessarily obscuring the invention. Additionally, elements in the drawing figures are not necessarily drawn to scale. For example, the dimensions of some of the elements in the figures may be exaggerated relative to other elements to help improve understanding of embodiments of the present invention. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the invention described herein are, for example, capable of operation in other orientations than those illustrated or otherwise described herein.

The terms "couple," "coupled," "couples," "coupling," and the like should be broadly understood and refer to connecting two or more elements or signals, electrically, mechanically and/or otherwise. Two or more electrical elements may be electrically coupled but not be mechanically or otherwise coupled; two or more mechanical elements may be mechanically coupled, but not be electrically or otherwise coupled; two or more electrical elements may be mechanically coupled, but not be electrically or otherwise coupled. Coupling may be for any length of time, e.g., permanent or semi-permanent or only for an instant.

"Electrical coupling" and the like should be broadly understood and include coupling involving any electrical signal, whether a power signal, a data signal, and/or other types or combinations of electrical signals. "Mechanical coupling" and the like should be broadly understood and include mechanical coupling of all types.

The absence of the word "removably," "removable," and the like near the word "coupled," and the like does not mean that the coupling, etc. in question is or is not removable.

DETAILED DESCRIPTION OF EXAMPLES OF EMBODIMENTS

Some embodiments include a system. The system comprises a conduit system comprising a conduit system volume. The conduit system is configured to convey a fluid through the conduit system volume of the conduit system. Further, the system comprises at least one pumping mechanism operable to drive the fluid through the conduit system volume, at least one turbine operable to extract energy from the fluid conveyed by the conduit system and driven by the at least one pumping mechanism, and at least one generator coupled to the at least one turbine and operable to generate electricity from the energy extracted by the at least one turbine. The electricity can comprise a first portion of the electricity and a second portion of the electricity. Meanwhile, the at least one pumping mechanism can be configured to be powered by the first portion of the electricity. Further, the conduit system can be configured such that the conduit system volume is able to be isolated from an atmosphere ambient to the system so as to seal the fluid in the conduit system volume and so that the conduit system volume is able to be pressurized to an operating pressure greater than an atmospheric pressure of the atmosphere ambient to the system. Also, the at least one pumping mechanism can be operable to drive the fluid through the conduit system and the at least one turbine is operable to extract the energy from the fluid when the fluid is sealed in the conduit system volume and when the conduit system volume is pressurized to the operating pressure.

In these or other embodiments, the fluid can comprise liquid water, the conduit system can be configured to cycle the fluid driven by at least one pumping mechanism so that the fluid output by the at least one turbine is returned to the at least one pumping mechanism, and/or the system can be configured to make available one or more parts of the second portion of the electricity to one or more electrical loads.

Further embodiments include a method of manufacturing a system. The method can comprise: providing a conduit system comprising a conduit system volume, the conduit system being configured to convey a fluid through the conduit system volume of the conduit system; providing at least one pumping mechanism operable to drive the fluid through the conduit system volume; providing at least one turbine operable to extract energy from the fluid conveyed by the conduit system and driven by the at least one pumping mechanism; providing at least one generator operable to generate electricity from the energy extracted by the at least one turbine; coupling the at least one pumping mechanism and the at least one turbine to the conduit system; and coupling the at least one generator to the at least one turbine. In these embodiments, the system can comprise the conduit system, the at least one pumping mechanism, the at least one turbine, and the at least one generator. Meanwhile, the electricity can comprise a first portion of the electricity and a second portion of the electricity. Further, the at least one pumping mechanism can be configured to be powered by the first portion of the electricity, and further still, the conduit system can be configured such that the conduit system volume is able to be isolated from an atmosphere ambient to the system so as to seal the fluid in the conduit system volume and so that the conduit system volume is able to be pressurized to an operating pressure greater than an atmospheric pressure of the atmosphere ambient to the system. Also, the at least one pumping mechanism can be operable to drive the fluid through the conduit system and the at least one turbine is operable to extract the energy from the fluid when the fluid is sealed in the conduit system volume and when the conduit system volume is pressurized to the operating pressure.

Turning to the drawings, FIG. 1 illustrates a representative block diagram of system 100, according to an embodiment. System 100 is merely exemplary and is not limited to the embodiments presented herein. System 100 can be implemented in many different embodiments or examples not specifically depicted or described herein. In many embodiments, system 100 can comprise a hydroelectric or water power system.

System 100 comprises conduit system 101, one or more pumping mechanisms 102, one or more turbines 103, one or more generators 104, and electrical system 105. Meanwhile, conduit system 101 comprises conduit system volume 106. Further, system 100 can comprise one or more inverters 107, one or more gear boxes 108, and/or one or more energy storage devices 109. In these embodiments, electrical system 105 can comprise inverters 107. Further, although illustrated separately at FIG. 1, in many embodiments, electrical system 105 can comprise generator(s) 104 and/or energy storage device(s) 109. In various embodiments, system 100 can comprise a casing configured to hold part or all of conduit system 101, pumping mechanism(s) 102, turbine(s) 103, generator(s) 104, and/or electrical system 105.

In operation, conduit system 101 holds a fluid within conduit system volume 106. Further, conduit system 101 can isolate conduit system volume 106 from an atmosphere ambient to (e.g., proximal to and/or surrounding) system 100, thereby closing (e.g., sealing) the fluid within conduit system volume 106. In these embodiments, the atmosphere can comprise a gaseous atmosphere or a liquid atmosphere. Exemplary gaseous atmospheres can comprise the Earth's atmosphere and/or the atmosphere of a pressurized cabin (e.g., an aircraft cabin, a submarine cabin, a spacecraft cabin, etc.). An exemplary liquid atmosphere can comprise liquid water, such as, for example, when part or all of system 100 is located under liquid water.

In some embodiments, conduit system volume 106 can be pressurized to an operating pressure. The operating pressure can be greater than an atmospheric pressure of the atmosphere ambient to system 100, such as, for example, when the atmosphere comprises a gaseous atmosphere. In other embodiments, the operating pressure can be less than the atmospheric pressure of the atmosphere ambient to system 100, such as, for example, when the atmosphere comprises a liquid atmosphere.

In various embodiments, the operating pressure can exceed the atmospheric pressure by at least approximately 0.007 megapascals, 0.034 megapascals, 0.069 megapascals, 0.138 megapascals, and/or 0.207 megapascals. In some embodiments, the operating pressure can exceed the atmospheric pressure by approximately 0.241 megapascals. In these or other embodiments, the atmospheric pressure can be greater than or equal to approximately 0.101 megapascals and less than or equal to approximately 0.022 megapascals. In further embodiments, the atmospheric pressure can exceed 0.101 megapascals, such as, for example, when the atmosphere comprises liquid water. In some embodiments, the operating pressure can be devoid of a vacuum pressure. In many embodiments, the operating pressure can be approximately constant (e.g., within approximately ±0.01 or 0.02 megapascals) when system 100 is operating.

Further, the fluid can comprise any suitable gaseous or liquid substance or substances. For example, in many embodiments, the fluid can comprise liquid water. In these or other embodiments, the fluid can comprise one or more liquid substances less viscous than liquid water (e.g., at approximately room temperature). In some embodiments, implementing the less viscous liquid substance(s) (e.g., combining the less viscous liquid substance(s) with liquid water) for the fluid can permit the fluid to pass through conduit system volume 106 with less resistance due to frictional forces.

Further still, the fluid can comprise an operating temperature. In various embodiments, the operating temperature can be approximately equal to an atmospheric temperature of the atmosphere ambient to system 100. In many embodiments, the operating temperature can be greater than or equal to approximately 4.44 degrees Celsius and less than or equal to approximately 40.6 degrees Celsius. In many embodiments, the operating temperature can be approximately constant (e.g., within approximately ±1-3 degrees Celsius) when system 100 is operating.

Meanwhile, pumping mechanism(s) 102 are operable to drive (e.g., pump) the fluid at conduit system volume 106 such that conduit system 101 conveys the fluid through conduit system volume 106. Further, turbine(s) 103 are operable to extract energy from the fluid conveyed by conduit system 101 and driven by pumping mechanism(s) 102. Conduit system 101 can cycle (e.g., circulate and recirculate) the fluid conveyed by conduit system 101 and driven by pumping mechanism(s) 102 so that fluid output by turbine(s) 103 is returned to pumping mechanism(s) 102. Accordingly, in many embodiments, conduit system 101 can comprise a closed-loop system.

In many embodiments, pumping mechanism(s) 102 can drive the fluid at conduit system volume 106 and turbine(s) 103 can extract the energy from the fluid when conduit system 101 is isolating conduit system volume 106 from the atmosphere ambient to system 100 and closing (e.g., sealing) the fluid within conduit system volume 106, and when conduit system 101 is pressurized to the operating pressure. In these or other embodiments, pumping mechanism(s) 102 can cause conduit system volume 106 to become pressurized to the operating pressure by driving the fluid at conduit system volume 106.

In many embodiments, motion of the fluid through conduit system volume 106 can result substantially from the net driving forces on the fluid provided by pumping mechanism(s) 102 and negligibly from the net gravitational forces acting on the fluid. That is, in some embodiments, conduit system 101 can be configured such that the net gravitational forces acting on the fluid are approximately balanced across conduit system volume 106 so that the net gravitational forces approximately cancel out. For example, in some embodiments, the net driving forces can exceed the net gravitational forces by at least a factor of 1.5, 2, 5, or 10.

Meanwhile, when the fluid is being driven through conduit system volume 106 by pumping mechanism(s) 102, the fluid can comprise a hydraulic head. In these embodiments, a static (elevation) head component and/or a pressure head component of the hydraulic head can comprise approximately zero meters, such as, for example, when the gravitational forces acting on the fluid are approximately balanced across conduit system volume 106. In these or other embodiments, a velocity head component and/or a resistance head component of the hydraulic head can be greater than the static head component and/or the pressure head component of the hydraulic head. For example, in some embodiments, the velocity head component and/or resistance head component can exceed the static head component and/or the pressure head component by at least a factor of 1.5, 2, 5, or 10.

Generator(s) 104 are operable to generate electricity from the energy extracted from the fluid by turbine(s) 103. Accordingly, generator(s) 104 are electrically coupled (e.g., via electrical system 105), and in many embodiments, mechanically coupled, to turbine(s) 103. The electricity generated by generator(s) 104 can comprise a first portion of the electricity and/or a second portion of the electricity.

As introduced briefly here, and discussed in greater detail below, system 100 and/or generator(s) 104 can make available one or more parts of the second portion of the electricity to one or more electrical loads 110. Accordingly, generator(s) 104 can be electrically coupled (e.g., selectively electrically coupled) to electrical load(s) 110 (e.g., via electrical system 105). Electrical load(s) 110 can comprise one or more electrical grids 111, one or more structural loads 112, one or more vehicular loads 113, and/or energy storage device(s) 109. Electrical grid(s) 111 can comprise one or more electrical networks for transferring electricity between electricity suppliers and electricity consumers; structural load(s) 112 can comprise any suitable electronic system(s) and/or device(s) of one or more buildings; vehicular load(s) 113 can comprise any suitable electronic system(s), energy storage device(s), and/or device(s) of one or more vehicles (e.g., car(s), boat(s), aircraft(s), spacecraft(s), etc.); and energy storage device(s) 109 can comprise any suitable device configured to store energy. In some embodiments, structure load(s) 112 additionally or alternatively can comprise one or more process loads. In these or other embodiments, a process loads can refer to an electrical load that is independent of (e.g., separate from) a building but that results from an electronic device or system. Exemplary storage device(s) 109 can comprise one or more batteries, one or more fuel cells, one or more capacitive energy storage devices (e.g., one or more super capacitors such as electric double-layer capacitors), and/or one or more inertial energy storage devices (e.g., one or more flywheels). In some embodiments, the energy storage device(s) of vehicular load(s) 113 can be similar or identical to energy storage device(s) 109.

Meanwhile, pumping mechanism(s) 102 can be powered by the first portion of the electricity. In these or other embodiments, pumping mechanism(s) 102 can be powered by electricity from one or more of electrical grid(s) 111 and/or energy storage device(s) 109. For example, pumping mechanism(s) 102 can be powered by electricity from electrical grid(s) 111, energy storage device(s) 109, or one or more other electricity sources (e.g., solar panels, windmills, etc.) until the first portion of the electricity becomes sufficient to electrically power pumping mechanism(s) 102 alone. Accordingly, pumping mechanism(s) 102 can be electrically coupled (e.g., via electrical system 105) to electrical grid(s) 111, energy storage device(s) 109, and/or the one or more other electricity sources. When the first portion of the electricity becomes sufficient to electrically power pumping mechanism(s) 102 without electricity provided from electrical grid(s) 111, energy storage device(s) 109, and/or other electricity sources, electrical grid(s) 111, energy storage device(s) 109, and/or the other electricity sources can be electrically decoupled from pumping mechanism(s) 102, leaving the first portion of the electricity to sustain electrical power to pumping mechanism(s) 102. In other words, generator(s) 104 can provide all (one hundred percent) of the electrical power to operate pumping mechanism(s) 102 when system 100 is operating (e.g., after a start or ramp up period), and electricity from any sources other than generator(s) 104 can be needed to electrically power system 100 and/or pumping mechanism(s) 102 only during a start or ramp up period for system 100 and/or pumping mechanism(s) 102. Thus, generally, the second portion of the electricity can comprise a surplus portion of the electricity remaining over an operational portion (i.e., the first portion) of the electricity needed to electrically power pumping mechanism(s) 102.

In implementation, conduit system 101 can comprise one or more conduits (e.g., pipes). Further, conduit system 101 can comprise one or more fittings (e.g., elbows, tees, crosses, etc.), one or more valves, and/or one or more tanks. Further still, conduit system 101 can comprise one or more seals (e.g., gaskets, o-rings, etc.), one or more gauges and sensors (e.g., one or more pressure gauges and sensors, one or more temperature gauges and sensors, etc.), and/or one or more exhaust vents.

The conduit(s) of conduit system 101 can comprise any suitable conduit(s) configured to hold and convey the fluid implemented for system 100. The dimensions, material(s), and/or alignment(s) of the conduit(s) of conduit system 100 can be selected according to cost, availability, the fluid being implemented with system 100, etc. In many embodiments, the conduit(s) can comprise one or more tubes. In some embodiments, some or all of the conduit(s) (e.g., tube(s)) can comprise a largest cross sectional dimension (e.g., diameter) of approximately 1.27 centimeters and/or approximately 5.08 centimeters. Further, in these or other embodiments, the conduit(s) (e.g., tube(s)) can comprise one or more metal materials (e.g., copper, stainless steel) and/or one or more polymer materials. In specific examples, the conduit(s) (e.g., tube(s)) can comprise a type-L hard-drawn copper material. Further still, in these or other embodiments, the conduit(s) (e.g., tube(s)) of conduit system 101 can be linear and/or curved.

The fitting(s) of system 101 can indirectly couple together the conduit(s) of conduit system 101. The fitting(s) can comprise similar or identical material(s) to the conduit(s) of system 101, and/or can be sized based on the dimensions of the conduit(s). In other embodiments, the fitting(s) of conduit system 101 can be omitted, such as, for example, where a single conduit is directly coupled to itself, or where multiple conduits are directly coupled together, such as by welding.

The valve(s) of system 101 can be operable to control a flow of the fluid through conduit system volume 106. Accordingly, the valve(s) can be coupled to (e.g., between) the conduit(s) of system 101. The valve(s) can comprise similar or identical material(s) to the conduit(s) and/or fitting(s) of system 101. For example, the valve(s) can comprise one or more isolation valves configured to permit and/or impede a flow of the fluid through conduit system volume 106, and can comprise one or more check valves configured to restrict a direction of the flow of the fluid (e.g., restricting back flow of the fluid) through conduit system volume 106. In specific examples, the isolation valve(s) can be implemented as one or more full-port ball valve(s). The ball valve(s) each can comprise a bronze material with stainless steel shaft and ball and polyethylfluoroethylene (PTFE) seats. Meanwhile, the check valve(s) can be implemented as spring-loaded check valves. The spring-loaded check valve(s) can comprise a bronze body and PTFE seats. Still, in other embodiments, the valve(s), the isolation valve(s), and/or the check valve(s) of conduit system 101 can be omitted.

The tank(s) of conduit system 101 can be coupled to and/or between the conduit(s). For example, the tank(s) can comprise one or more expansion tanks and/or one or more buffer tanks. The expansion tank(s) can be configured to accommodate for expansion and/or contraction of the fluid within conduit system volume 106 due to fluctuations in temperature of and/or pressure acting on the fluid. For example, the expansion tank(s) permit the pressure acting on the fluid to remain more predictable and/or approximately constant, particularly when the fluid comprises an incompressible fluid. Meanwhile, the buffer tank(s) can be operable as one or more reservoirs configured to increase conduit system volume 106 to permit conduit system 101 to hold more volume of fluid, thereby permitting consistent and predictable operation of system 100 by preventing cavitation of pumping mechanism(s) 102.

In many embodiments, conduit system volume 106 can comprise the internal volume or volumes of the conduit(s), fitting(s), valve(s), and/or tank(s) of conduit system 101. Accordingly, the internal volume(s) of the conduit(s), fitting(s), valve(s), and/or tank(s) of conduit system 101 can hold and convey the fluid implemented for system 100.

Meanwhile, the seal(s) of conduit system 101 can be implemented, as needed, between the conduit(s), fitting(s), valve(s), and/or tank(s) of system 100 to prevent gaps there between so that conduit system 101 can isolate conduit system volume 106 from an atmosphere ambient to (e.g., proximal to and/or surrounding) system 100, as discussed above. Further, the gauge(s) of conduit system 101 can be coupled to the conduit(s), fitting(s), valve(s), and/or tank(s) of conduit system 101 and can be implemented so that characteristics (e.g., pressure, temperature, etc.) of the fluid can be monitored. Further still, the exhaust vent(s) of conduit system 101 can be operable to vent gas (e.g., air) from conduit system volume 106 so that conduit system 101 can isolate conduit system volume 106 from an atmosphere ambient to (e.g., proximal to and/or surrounding) system 100, as discussed above. When the exhaust vent(s) of conduit system 101 are operable to vent air from conduit system volume 106, the exhaust vent(s) can comprise manual air vents. In other embodiments, the seal(s), the gauge(s), and/or the exhaust vent(s) can be omitted.

System 100, conduit system 101, and/or the conduit(s) of conduit system 101 can be arranged in any suitable manner (e.g., vertical, horizontal, or other). However, in many embodiments, part or all of conduit system 101 can be arranged substantially vertically to decrease a surface footprint of system 100 to conserve space. The arrangement of conduit system 101 can also depend on site space constraints. Pumping mechanism(s) 102 and turbine(s) 103 can be coupled to (e.g., coupled in line with) the conduit(s) of conduit system 101.

When pumping mechanism(s) 102 comprise multiple pumping mechanism(s), two or more pumping mechanisms of pumping mechanism(s) 102 can be arranged in series and/or in parallel to each other. Likewise, when turbine(s) 103 comprise multiple turbine(s), two or more turbines of turbine(s) 103 can be arranged in series and/or in parallel to each other. The desired arrangements of pumping mechanism(s) 102 and/or turbine(s) 103 can be accomplished by the manner of arranging the conduit(s) and/or fitting(s) of conduit system 101.

Further, when pumping mechanism(s) 102 comprise multiple pumping mechanism(s), the multiple pumping mechanism(s) can be operable independent of each other, such as, for example, by selectively powering the multiple pumping mechanisms and/or by isolating one or more of the multiple pumping mechanisms by using the isolation valve(s). Likewise, when turbine(s) 103 comprise multiple turbine(s), the multiple turbine(s) can be operable independent of each other, such as, for example, by isolating one or more of the multiple turbines using the isolation value(s). Accordingly, the quantity of the electricity generated by generator(s) 104 can be increased or decreased, depending on the number of pumping mechanisms of pumping mechanism(s) 102 and/or the number of turbines of turbine(s) 103 operating. Further, implementing multiple pumping mechanism of pumping mechanism(s) 102 and/or implementing multiple turbines of turbine(s) 103 can permit one or more of pumping mechanism(s) 102 and/or turbine(s) 103 to be serviced while system 100, as a whole, remains operable by the remaining pumping mechanisms and/or turbines.

Pumping mechanism(s) 102 can comprise any suitable mechanism(s) configured to drive (e.g., pump) a fluid (e.g., liquid water). In many embodiments, pumping mechanism(s) 102 each can comprise a pump and a motor. The pump can comprise an impeller and a housing (e.g., volute) configured to house the impeller. Meanwhile, the motor can drive the pump (e.g., impeller). The motor can be coupled (e.g., directly coupled) with the pump (e.g., impeller).

In these or other embodiments, the pump can comprise any suitable material(s) (e.g., one or more polymer and/or one or more metal materials). For example, the housing can comprise a bronze material and/or the impeller can comprise a stainless steel material. In some embodiments, the pump can be implemented with an in-line configuration, and/or the pump can require little or no maintenance.

In many embodiments, pumping mechanism(s) 102 can be configured to drive a fluid (e.g., liquid water) at approximately 371 liters per minute, such as, for example, when the fluid comprises a hydraulic head of approximately 24.4 meters and/or when the impeller rotates at a rotational speed of approximately 1800 rotations per minute. Further, one or more of the motor(s) of pumping mechanism(s) can be implemented to draw approximately 1.49 kilowatts per 20 Amperes at 120 volts and the housing/impeller can be implemented with an approximately 2.54 centimeter by an approximately 2.54 centimeter configuration.

For example, in specific embodiments, pumping mechanism(s) 102 each can comprise a Bell & Gossett pump volute/impeller Model #1×1×5¼ Series 60, manufactured by Xylem Inc. of Rye Brook, N.Y., United States of America. In these embodiments, the Bell & Gossett pump volute/impeller implemented for each of pumping mechanism(s) 102 can be driven by one motor configured to draw approximately 1.49 kilowatts per 20 Amperes at 120 volts.

Further, turbine(s) 103 can comprise any suitable mechanism(s) configured to extract energy from the fluid (e.g., liquid water). In some embodiments, turbine(s) 103 can be similar to pumping mechanism(s) 102 but arranged in reverse such that an inlet and an outlet of the housing (e.g., volute) of each of turbine(s) 103 are opposite of the pumping arrangement. The housing/impeller of each of turbine(s) 103 can be implemented with an approximately 3.81 centimeter by an approximately 3.18 centimeter configuration. Turbine(s) 103 each can comprise a turbine shaft about which its impeller rotates, and the turbine shaft can comprise a turbine shaft diameter. Although the turbine shaft diameter can be any suitable dimension, in specific examples, the turbine shaft diameter can be approximately 2.54 centimeters. When operated as a pump, turbine(s) 103 can be configured to drive a fluid (e.g., liquid water) at approximately 189 liters per minute, such as, for example, when the fluid comprises a hydraulic head of approximately 16.8 meters and/or when the impeller rotates at a rotational speed of 3600 rotations per minute. In these examples, the impeller can comprise a 17.8 centimeter diameter, and the impeller can be driven by an approximately 1.49 kilowatt motor per 20 Amperes at 120 volts.

For example, in specific embodiments, turbine(s) 103 each can comprise a Bell & Gossett pump volute/impeller Model #1.25AD-es, manufactured by Xylem Inc. of Rye Brook, N.Y., United States of America. In these embodiments, the Bell & Gossett pump volute/impeller implemented for each of turbine(s) 103 can comprise a turbine shaft diameter of approximately 2.54 centimeters and can be driven by one motor configured to draw approximately 1.49 kilowatts per 20 Amperes at 120 volts.

Meanwhile, generator(s) 104 can comprise any suitable mechanism(s) configured to generate electricity from the energy extracted from the fluid by turbine(s) 103. In various embodiments, when generator(s) 104 comprise multiple generators, the multiple generator(s) can be operable independently of each other.

In many embodiments, generator(s) 104 each can be configured to generate a rated electric power (e.g., approximately 3.5 kilowatts) when running at a minimum rotational speed (e.g., approximately 250 rotations per minute). In some embodiments, generator(s) 104 can be implemented as one or more direct current generators. In many embodiments, generator(s) 104 can be horizontally, vertically, or otherwise mounted, as desirable. In these or other embodiments, generator(s) 104 each can comprise a weight of 78 kilograms.

In these or other embodiments, generator(s) 104 each can comprise a permanent magnet generator/alternator configuration with a rectified direct current rated at an electric current (e.g. approximately 11 Amperes), with a rated torque (e.g., approximately 150 Newton-meters at the rated power), and/or with a starting torque (e.g., approximately 2 Newton-meters). Further, in these or other embodiments, generator(s) 104 can comprise a phase resistance (e.g., approximately 5.1 Ohms with H-class insulation). In many embodiments, pumping mechanism(s) 102 and turbine(s) 103 can be selected to be able to achieve the starting and rated torques and the minimum rotational speed of generator(s) 104. Notably, these values can depend on the generator(s) implemented for generator(s) 104.

Meanwhile, generator(s) 104 each can comprise a generator shaft, and the generator shaft can comprise a generator shaft diameter. Like the turbine shaft diameter, the generator shaft diameter can be any suitable dimension, but in specific examples, the turbine shaft diameter can be approximately 4 centimeters.

For example, in specific embodiments, generator(s) 104 each can comprise a generator of Model GL-PMG-3500, manufactured by Ginlong Technologies of Xiangshan, Ningbo, Zhejiang, 315712, China.

In many embodiments, the turbine shaft(s) of turbine(s) 103 can be coupled to the generator shaft(s) of generator(s) 104 by one or more shaft couplers. In these or other embodiments, the turbine shaft(s) of turbine(s) 103 can be coupled to the generator shaft(s) of generator(s) 104 by gear box(es) 108. Coupling turbine(s) 103 (e.g., the turbine shaft(s) of turbine(s) 103) to generator(s) 104 (e.g., the generator shaft(s) of generator(s) 104) can permit turbine(s) 103 to spin generator(s) 104 so that generator(s) 104 can generate electricity as turbine(s) 103 are turned by the fluid driven by pumping mechanism(s) 102.

Gear box(es) 108 can be operable to regulate (e.g., limit) a rotational speed of generator(s) 104. Accordingly, a voltage of the electricity generated by generator(s) 104 can be controlled (e.g. limited). For example, various governing and/or regulatory bodies require that a voltage of electricity made available to the electric grids of the regions they govern and/or regulate do not exceed a certain voltage. In specific examples, gear box(es) 108 can be configured to prevent the electricity from exceeding 600 volts. In some embodiments, the voltage of the electricity generated by generator(s) 104 may additionally or alternatively be controlled by regulating a rotational speed of pumping mechanism(s) 102. Meanwhile, the shaft coupler(s) implemented for system 100 can be selected based on the turbine shaft diameter(s) and/or cross section(s) and based on the generator shaft diameter(s) and/or cross section(s). In some embodiments, gear box(es) 108 can be omitted, such as, for example, when the voltage of the electricity generated by generator(s) 104 is not regulated and/or where turbine(s) 103 are insufficient to cause the voltage to exceed a maximum regulatory and/or operational value. In these or other embodiments, the shaft coupler(s) can be omitted, such as, for example, when the turbine shaft(s) are coupled directly to the generator shaft(s), such as by welding.

In many embodiments, system 100 can be implemented having one generator of generator(s) 104 per turbine of turbine(s) 103 (i.e., paired one-to-one). However, in some embodiments, system 100 can be implemented having multiple generators of generator(s) 104 per turbine of turbine(s) 103. In many embodiments, each of pumping mechanism(s) 102 can be similar or identical to each other, but in other embodiments, when pumping mechanism(s) 102 comprise multiple pumping mechanisms, two or more of pumping mechanism(s) 102 can comprise different types and/or configurations. In these or other embodiments, each of turbine(s) 103 can be similar or identical to each other, but in other embodiments, when turbine(s) 103 comprise multiple turbines, two or more of turbine(s) 103 can comprise different types and/or configurations. Further in these or other embodiments, each of generator(s) 104 can be similar or identical to each other, but in other embodiments, when generator(s) 104 comprise multiple generators, two or more of generator(s) 104 can comprise different types and/or configurations. The electric power of the electricity, the first portion of the electricity, and/or the second portion of the electricity generated by generator(s) 104 can depend on the configuration(s), type(s), arrangement(s), and/or use of pumping mechanism(s) 102, turbine(s) 103, and/or generator(s) 104. In many embodiments, the electric power of the second portion of the electricity can be greater than or equal to approximately 2 kilowatts. In some embodiments, system 100 can make available additional electricity to certain ones of electrical load(s) 110 (e.g., electric grid(s) 111, structural load(s) 112, vehicular load(s) 113, etc.) by simultaneously making available electricity from energy storage device(s) 109 and the part(s) of the second portion of the electricity generated from generator(s) 104 to the certain ones of electrical load(s) 110. For example, in these or other embodiments, up to approximately 10 kilowatts can be made available.

As introduced above, system 100 and/or generator(s) 104 can make available one or more parts of the second portion of the electricity generated by generator(s) 104 to electrical load(s) 110. Further, the first portion of the electricity generated by generator(s) 104 can power pumping mechanism(s) 102. Accordingly, electrical system 105 can electrically couple (e.g., selectively electrically couple) one or more elements of system 100 together, and can electrically couple (e.g., selectively electrically couple) one or more elements of system 100 with electrical load(s) 110. Thus, in various embodiments, electrical system 105 can comprise inverter(s) 107 and one or more wires and electrical components. Further, in some embodiments, electrical system 105 can comprise one or more electric breakers, one or more electrical conduits, one or more disconnect switches, one or more panel boards, and/or one or more control panels.

Figure 10:
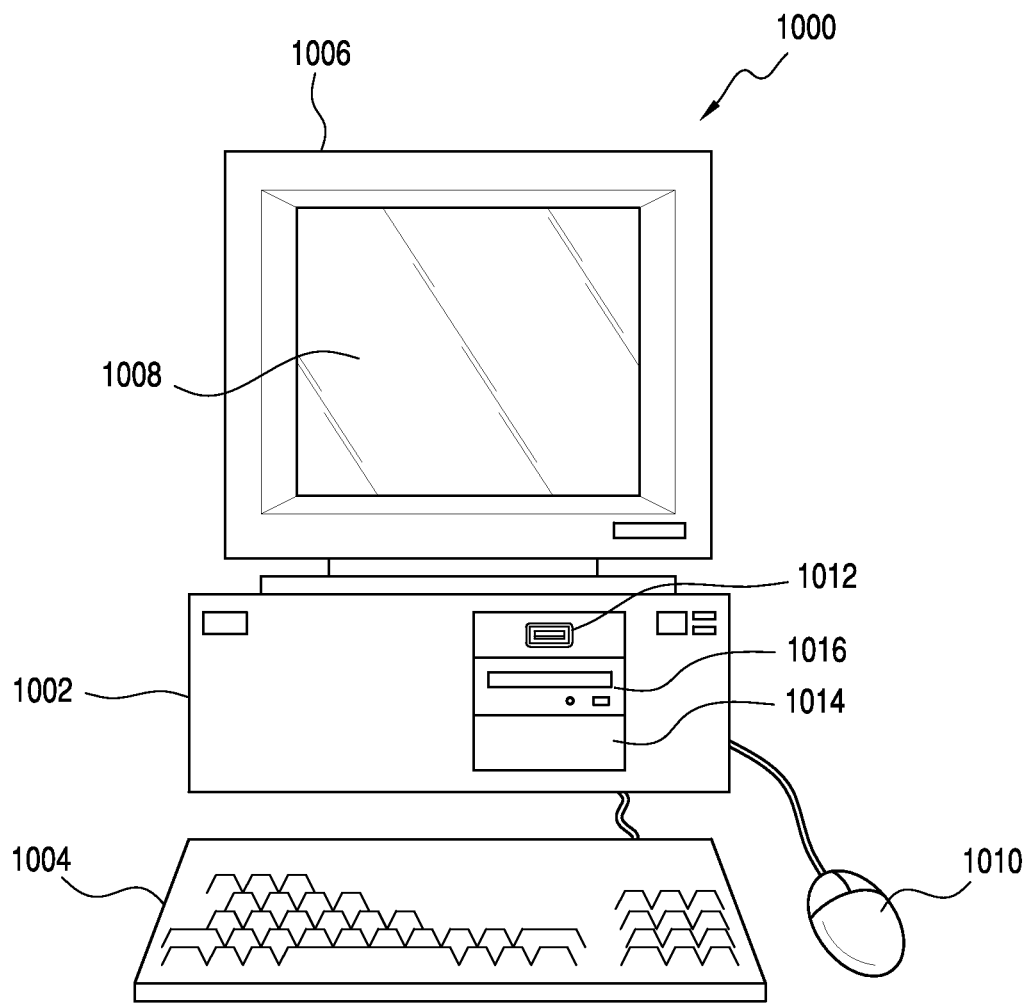
FIG. 10 illustrates a front elevational view of an exemplary computer system that is suitable to implement at least part of a computer system of the systems of FIGS. 1-6.

Further still, in some embodiments, electrical system 105 can comprise a computer system (e.g., micro-controller) and/or communications system to operate pumping mechanism(s) 102, turbine(s) 103, and/or generator(s) 104, and/or to control how and when the part(s) of the second portion of the electricity generated by generator(s) 104 is made available to electrical load(s) 110. In many embodiments, the computer system can be similar or identical to computer system 1000 (FIG. 10). In other embodiments, the computer system and/or communication system can be omitted. In these or other embodiments, part or all of system 100 can be manually operated.

Meanwhile, the communication system can be operable to provide communication between the computer system, pumping mechanism(s) 102, turbine(s) 103, generator(s) 104, and/or any other elements of system 100, as applicable. The communication system can be implemented using any suitable manner of wired and/or wireless communication. Accordingly, the communication system can comprise any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), Powerline network protocol(s), etc.). Exemplary PAN protocol(s) can comprise Bluetooth, Zigbee, Wireless Universal Serial Bus (USB), Z-Wave, etc.; exemplary LAN and/or WAN protocol(s) can comprise Institute of Electrical and Electronic Engineers (IEEE) 802.3, IEEE 802.11, etc.; and exemplary wireless cellular network protocol(s) can comprise Global System for Mobile Communications (GSM), General Packet Radio Service (GPRS), Code Division Multiple Access (CDMA), Evolution-Data Optimized (EV-DO), Enhanced Data Rates for GSM Evolution (EDGE), 3GSM, Digital Enhanced Cordless Telecommunications (DECT), Digital AMPS (IS-136/Time Division Multiple Access (TDMA)), Integrated Digital Enhanced Network (iDEN), etc. The specific communication software and/or hardware implemented can depend on the network topologies and/or protocols implemented, and vice versa. In many embodiments, exemplary communication hardware can comprise wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can comprise wireless communication hardware including, for example, one or more radio transceivers, one or more infrared transceivers, etc. Additional exemplary communication hardware can comprise one or more networking components (e.g., modulator-demodulator components, gateway components, etc.).

Meanwhile, the wire(s) and/or electrical component(s) of electrical system 105 can electrically couple (e.g., selectively electrically couple) one or more elements of system 100 together, and can electrically couple (e.g., selectively electrically couple) one or more elements of system 100 with electrical load(s) 110. The electrical component(s) can comprise one or more electrical switches configured to permit and interrupt a flow of electricity. Further, in some embodiments, the electrical switch(es) can comprise one or more arc fault circuit interrupter (AFCI) circuits (e.g., direct current AFCI circuits) as a safety precaution. In many embodiments, the electrical conduits can enclose the wire(s) and/or electrical component(s) of electrical system 105, such as, to protect and/or insulate the wire(s) and/or electrical component(s).

The electrical breaker(s) of electrical system 105 can be implemented to couple the wire(s) and/or electrical component(s) to electrical load(s) 110, such as, for example, when electrical load(s) 110 comprise structural load(s) 112. The control panel(s) of system 105 can be configured to provide collective control and/or monitoring of system 100. For example, the control panel(s) can comprise operational inputs (e.g., on/off button(s), start-stop button(s), etc.) for operating system 100, and/or can comprise and display the pressure gauge(s) of conduit system 101 for monitoring system 100. In some embodiments, the control panel(s) can comprise one or more graphical user interface(s) provided via the computer system of electrical system 105. In other embodiments, the control panel(s) can be omitted.

Meanwhile, inverter(s) 107 can comprise one or more direct current (DC) to alternating current (AC) inverters and/or one or more AC to DC inverters. The DC to AC inverter(s) can convert an electric current of electricity from DC to AC, and the AC to DC inverter(s) can convert an electric current of electricity from AC to DC. In many embodiments, inverter(s) 107 can comprise one or more of the AFCI circuits. Further, inverter(s) 107 can be transformer-based.

In these or other embodiments, inverter(s) 107 can be implemented, as needed, to convert a type of an electric current of the electricity, the first portion of the electricity, and/or the one or more parts of the second portion of the electricity generated by generator(s) 104. Accordingly, implementation of inverter(s) 107 can depend on electric current requirements (e.g., either DC or AC) of pumping mechanism(s) 102 and/or electrical load(s) 110 and on an electric current type and/or electric power level of generator(s) 104. Any suitable number of inverter(s) 107 can be implemented, but in many embodiments, one inverter of inverter(s) 107 can be implemented for each of generator(s) 104 (i.e., paired one-to-one) or multiple of generator(s) 104, and/or one inverter of inverter(s) 107 can be implemented for each of energy storage device(s) 109 (i.e., paired one-to-one) or multiple of energy storage device(s) 109.

For example, in some embodiments, when generator(s) 104 comprise direct current generator(s), inverter(s) 107 can comprise one DC to AC inverter for each generator of generator(s) 104. These DC to AC inverter(s) can convert the DC current of one or more parts of the second portion of the electricity made available to electrical load(s) 110 to AC current for use by one or more of electrical load(s) 110. Meanwhile, in these or other embodiments, when system 100 comprises energy storage device(s) 109, inverter(s) 107 can comprise one AC to DC inverter for each energy storage device of energy storage device(s) 109, such as, for example, to convert the AC current back to DC current for energy storage device(s) 109.

Meanwhile, in other embodiments, generator(s) 104 can comprise direct current generators, system 100 can comprise energy storage device(s) 109, and inverter(s) 107 can comprise one DC to AC inverter configured to make available the part(s) of the second portion of the electricity to energy storage device(s) 109 with direct current (i.e., without conversion to AC and at a DC side of the DC to AC inverter) and configured to make available the part(s) of the second portion of the electricity to one or more other electrical loads of electrical load(s) 110 with alternating current (i.e., with conversion to AC at the AC side of the inverter).

In some embodiments, generator(s) 104 can be selected based in part of the maximum power point tracker (MPPT) window of inverter(s) 107, and inverter(s) 107 can be selected based on the voltage of the electricity generated by generator(s) 104. That is, the MPPT window of inverter(s) 107 and the voltage of the electricity generated by generator(s) 104 can be approximately matched. For example, inverter(s) 107 can comprise a 480 volt direct current MPPT window and generator(s) 104 can generate the electricity with 450 volt direct current at the minimum rotational speed rating of generator(s) 104. When one inverter of inverter(s) 107 is paired with multiple generators of generator(s) 104, the inverter can be matched to multiple MPPT windows of the multiple generators to account for mismatch in the multiple MPPT windows.

In many embodiments, the electricity generated by generator(s) 104 can be combined (e.g., into a single feed) at a panel board of electrical system 105. The panel board and/or one or more of inverter(s) 107 can comprise a visible-break disconnect switch and/or a fused disconnect to couple the panel board and/or the one or more of inverter(s) 107 with one or more of electrical load(s) 110. The one or more parts of the second portion of the electricity generated by generator(s) 104 can be made available to electrical load(s) 110 via the panel board and/or the one or more of inverter(s) 107. In many embodiments, one or more of the electrical coupling(s) of electrical system 105 can be configured for bi-directional electricity flow.

For example, in specific embodiments, inverter(s) 107 can comprise: (i) at least one Sunny Boy inverter of Model 5000-US, manufactured by SMA America, LLC of Rocklin, Calif., United States of America; (ii) at least one Radian inverter of Model GS8048, manufactured by Outback Power Inc. of Arlington, Wash., United States of America; and/or (iii) at least one inverter of Model DRI-10, manufactured by Outback Power Inc. of Lawrenceville, N.J., United States of America.

As introduced above, system 100 and/or generator(s) 104 can make available one or more parts of the second portion of the electricity generated by generator(s) 104 to structural load(s) 112 and/or vehicular load(s) 113 when electric load(s) 110 comprise structural load(s) 112 and/or vehicular load(s) 113. Accordingly, system 100 can be implemented to electrically power structural load(s) 112 and/or vehicular load(s) 113. Because system 100 can operate independently of electrical grid(s) 111, system 100 can be implemented to electrically power structural load(s) 112 and/or vehicular load(s) 113 that are electrically decoupled and/or remote from electrical grid(s) 111. That is, system 100 can be implemented to provide off-grid electricity to structural load(s) 112 and/or vehicular load(s) 113.

Meanwhile, in these or other embodiments, system 100 and/or generator(s) 104 can make available one or more parts of the second portion of the electricity generated by generator(s) 104 to electrical grid(s) 111 when electric load(s) 110 comprise electrical grid(s) 111. In these embodiments, the part(s) of the second portion of the electricity generated by generator(s) 104 may be sold to one or more operator(s) of electrical grid(s) 111. The part(s) of the second portion of the electricity generated by generator(s) 104 may also be used for grid balancing electrical grid(s) 111. Further, in some embodiments, electrical grid(s) 111 can provide electricity to pumping mechanism(s) 102, as described above.

Further, in these or other embodiments, system 100 and/or generator(s) 104 can make available one or more parts of the second portion of the electricity generated by generator(s) 104 to energy storage device(s) 109 when electric load(s) 110 comprise energy storage device(s) 111. In these embodiments, the part(s) of the second portion of the electricity generated by generator(s) 104 provided to energy storage device(s) 109 can be stored for later use and/or, when applicable, later made available and/or sold to electrical grid(s) 111. Implementing system 100 to comprise energy storage device(s) 109 can be advantageous when access to electrical grid(s) 111 is unavailable. For example, energy storage device(s) 109 can store energy and make available electricity to structural load(s) 112 and/or vehicular load(s) 113 to provide an off-grid electricity source and/or to provide electricity when generator(s) 104 are not operating. Meanwhile, energy storage device(s) 109 can store energy and make available electricity to electrical grid(s) 111 at a later time if the operator(s) of electrical grid(s) 111 are not currently accepting and/or buying electricity. Further, in some embodiments, energy storage device(s) 109 can provide electricity to pumping mechanism(s) 102, as described above, such as, for example, when electrical grid(s) 111 are unavailable. Also, in some embodiments, energy storage device(s) 109 can receive electricity from electrical grid(s) 111. In other embodiments, energy storage device(s) 109 can be omitted, such as, for example, to reduce manufacturing costs.

Advantageously, in many embodiments, one or more of the elements of system 100 can be cost effectively implemented with readily available (non-custom) parts. Further, system 100 can be scaled in size, as desired, to fit electricity demands. However, in many embodiments, system 100 can occupy a volume of less than or equal to approximately 27 cubic meters. Meanwhile, system 100 can be implemented with minimal to no direct toxic and/or polluting effects. For example, liquid water can be readily available, cheap compared to fossil and other fuel sources used to generate electricity, and/or non-volatile. Further still, system 100 can be operated with minimal to no supervision for prolonged periods of time (e.g., hours, days, weeks, months, etc.) and using components requiring minimal training to operate and maintain.

Likewise, in some embodiments, the principles of system 100 can be integrated into existing systems (e.g., industrial processes) configured to convey fluids in circulating conduit systems.

In many embodiments, system 100 can be pre-fabricated and pre-assembled, shipped to site, and/or secured in place. Further, conduit system volume 106 can be filled with the fluid, system 100 can be electrically coupled to electrical load(s) 110, and system 100 can be tested (before and/or after electrically coupling system 100 to electrical load(s) 110).

Figure 2:
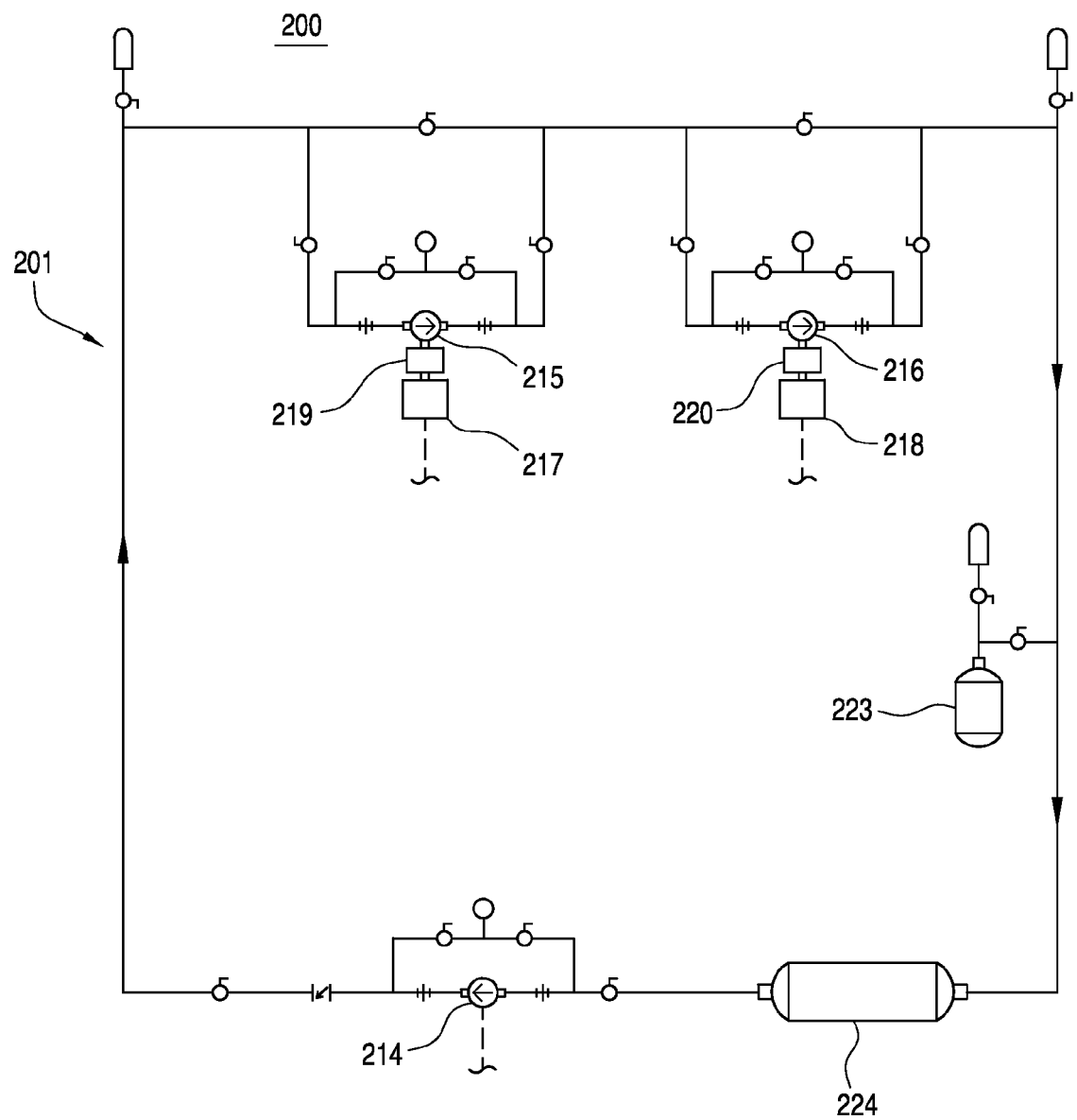
FIG. 2 illustrates a two-dimensional engineering fluid diagram of a system, according to an embodiment.

Turning now to the next drawing, FIG. 2 illustrates a two-dimensional engineering fluid diagram of system 200, according to an embodiment. System 200 is merely exemplary and is not limited to the embodiments presented herein. System 200 can be implemented in many different embodiments or examples not specifically depicted or described herein. System 200 can be similar or identical to system 100.

In many embodiments, system 200 can comprise conduit system 201. Further, system 200 can comprise pumping mechanism 214, turbine 215, turbine 216, generator 217, generator 218, gear box 219, gear box 220, expansion tank 223, and buffer tank 224, each of which can be coupled together by conduit system 201. In these or other embodiments, conduit system 201 can be similar or identical to conduit system 101 (FIG. 1). Further, pumping mechanism 214 can be similar or identical to one of pumping mechanism(s) 102 (FIG. 1); turbine 215 can be similar or identical to one of turbine(s) 103 (FIG. 1); turbine 216 can be similar or identical to one of turbine(s) 103 (FIG. 1); generator 217 can be similar or identical to one of generator(s) 104 (FIG. 1); generator 218 can be similar or identical to one of generator(s) 104 (FIG. 1); gear box 219 can be similar or identical to one of gear box(es) 108 (FIG. 1); gear box 220 can be similar or identical to one of gear box(es) 108 (FIG. 1); expansion tank 223 can be similar or identical to one of the expansion tank(s) described above with respect to system 100 (FIG. 1); and/or buffer tank 224 can be similar or identical to one of the buffer tank(s) described above with respect to system 100 (FIG. 1).

Figure 3:
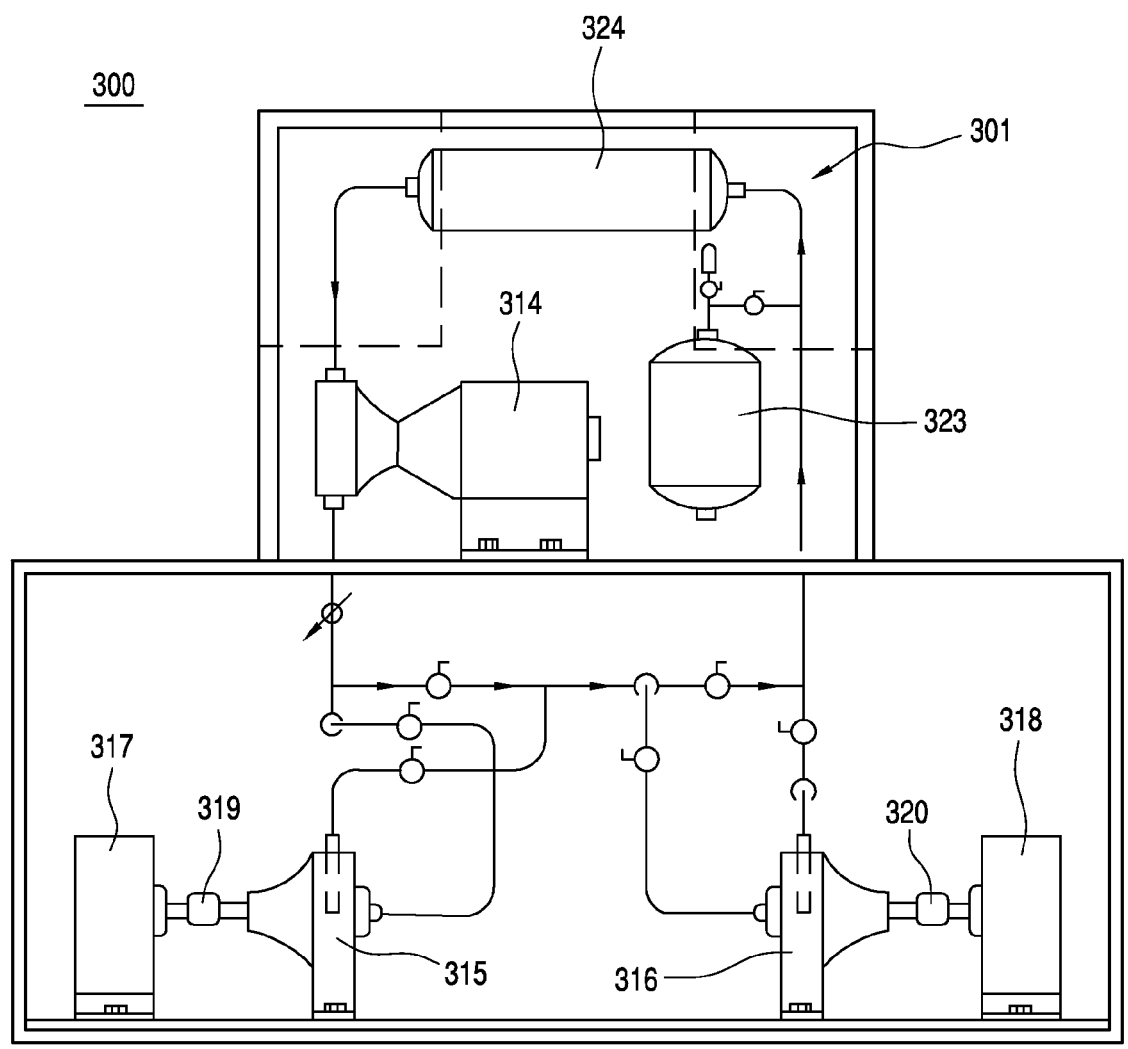
FIG. 3 illustrates a front view of a three-dimensional engineering fluid diagram of a system, according to an embodiment.
Figure 4:
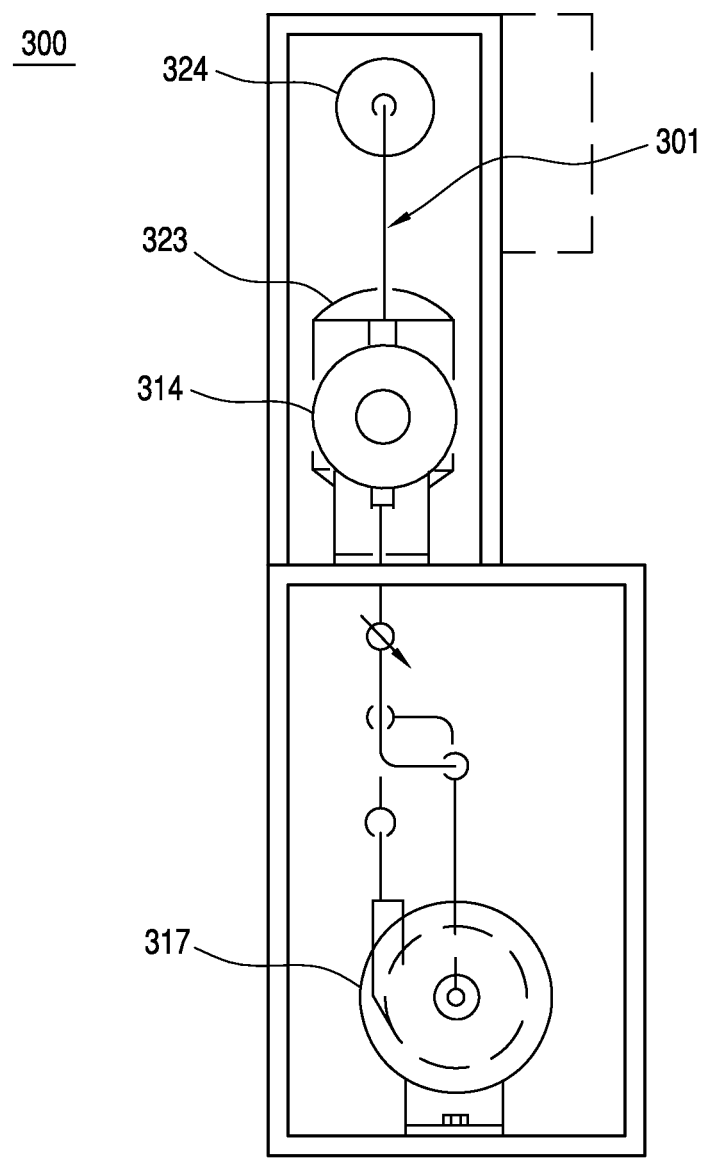
FIG. 4 illustrates a left side view of the three-dimensional engineering fluid diagram of the system of FIG. 3, according to the embodiment of FIG. 3.

Turning ahead in the drawings, FIG. 3 illustrates a front view of a three-dimensional engineering fluid diagram of system 300, according to an embodiment; and FIG. 4 illustrates a left side view of the three-dimensional engineering fluid diagram of system 300, according to the embodiment of FIG. 3. System 300 is merely exemplary and is not limited to the embodiments presented herein. System 300 can be implemented in many different embodiments or examples not specifically depicted or described herein. System 300 can be similar or identical to system 100 (FIG. 1) and/or similar to system 200 (FIG. 2).

Referring to FIG. 3, in many embodiments, system 300 can comprise conduit system 301. Further, system 300 can comprise pumping mechanism 314, turbine 315, turbine 316, generator 317, generator 318, gear box 319, gear box 320, expansion tank 323, and buffer tank 324, each of which can be coupled together by conduit system 301. In these or other embodiments, conduit system 301 can be similar or identical to conduit system 101 (FIG. 1) and/or similar to conduit system 201 (FIG. 2). Further, pumping mechanism 314 can be similar or identical to one of pumping mechanism(s) 102 (FIG. 1) and/or to pumping mechanism 214 (FIG. 2); turbine 315 can be similar or identical to one of turbine(s) 103 (FIG. 1) and/or to turbine 215 (FIG. 2); turbine 316 can be similar or identical to one of turbine(s) 103 (FIG. 1) and/or to turbine 216 (FIG. 2); generator 317 can be similar or identical to one of generator(s) 104 (FIG. 1) and/or to generator 217 (FIG. 2); generator 318 can be similar or identical to one of generator(s) 104 (FIG. 1) and/or to generator 218 (FIG. 2); gear box 319 can be similar or identical to one of gear box(es) 108 (FIG. 1) and/or to gear box 219 (FIG. 2); gear box 320 can be similar or identical to one of gear box(es) 108 (FIG. 1) and/or to gear box 220 (FIG. 2); expansion tank 323 can be similar or identical to one of the expansion tank(s) described above with respect to system 100 (FIG. 1) and/or to expansion tank 223 (FIG. 2); and/or buffer tank 324 can be similar or identical to one of the buffer tank(s) described above with respect to system 100 (FIG. 1) and/or buffer tank 224 (FIG. 2).

Figure 5:
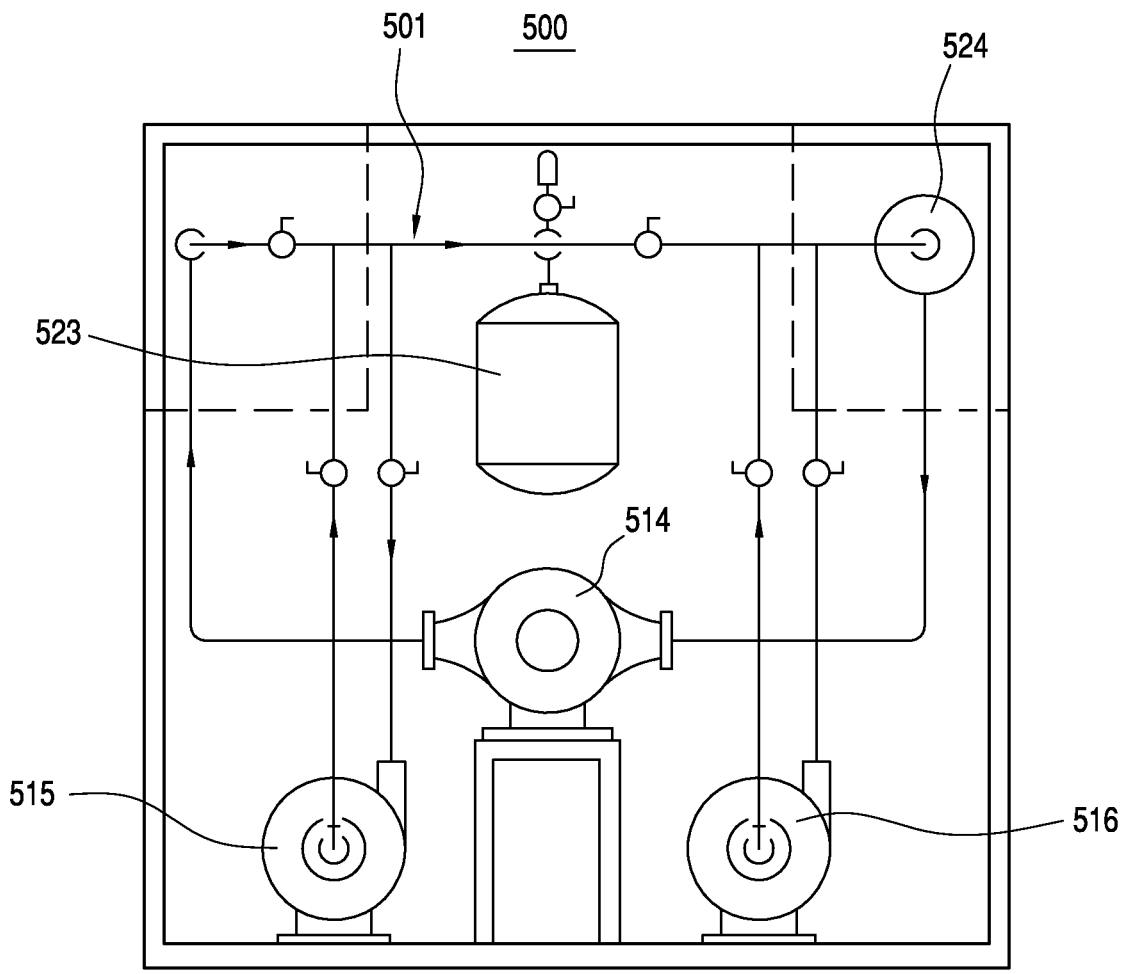
FIG. 5 illustrates a front view of a three-dimensional engineering fluid diagram of a system, according to an embodiment.
Figure 6:
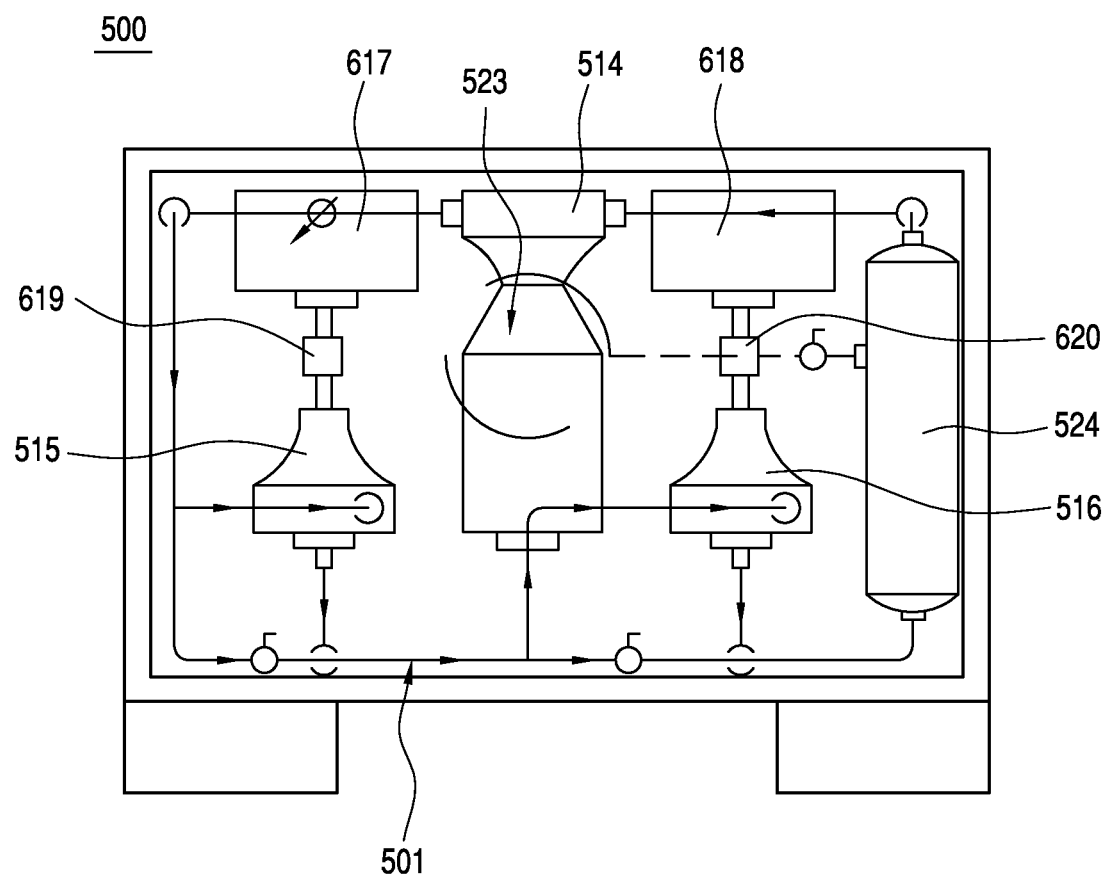
FIG. 6 illustrates a top view of the three-dimensional engineering fluid diagram of a system, according to the embodiment of FIG. 5.

Turning ahead again in the drawings, FIG. 5 illustrates a front view of a three-dimensional engineering fluid diagram of system 500, according to an embodiment; and FIG. 6 illustrates a top view of the three-dimensional engineering fluid diagram of system 500, according to the embodiment of FIG. 5. System 500 is merely exemplary and is not limited to the embodiments presented herein. System 500 can be implemented in many different embodiments or examples not specifically depicted or described herein. System 500 can be similar or identical to system 100 (FIG. 1), similar to system 200 (FIG. 2), and/or similar to system 300 (FIG. 3).

Referring to FIG. 5, in many embodiments, system 500 can comprise conduit system 501. Further, system 500 can comprise pumping mechanism 514, turbine 515, turbine 516, generator 617 (FIG. 6), generator 618 (FIG. 6), gear box 619 (FIG. 6), gear box 620 (FIG. 6), expansion tank 523, and buffer tank 524, each of which can be coupled together by conduit system 501. In these or other embodiments, conduit system 501 can be similar or identical to conduit system 101 (FIG. 1), similar to conduit system 201 (FIG. 2), and/or similar to conduit system 301 (FIGS. 3 & 4). Further, pumping mechanism 514 can be similar or identical to one of pumping mechanism(s) 102 (FIG. 1), to pumping mechanism 214 (FIG. 2), and/or to pumping mechanism 314 (FIGS. 3 & 4); turbine 515 can be similar or identical to one of turbine(s) 103 (FIG. 1), to turbine 215 (FIG. 2), and/or to turbine 315 (FIGS. 3 & 4); turbine 516 can be similar or identical to one of turbine(s) 103 (FIG. 1), to turbine 216 (FIG. 2), and/or to turbine 316 (FIGS. 3 & 4); generator 617 (FIG. 6) can be similar or identical to one of generator(s) 104 (FIG. 1), to generator 217 (FIG. 2), and/or to generator 317 (FIGS. 3 & 4); generator 618 (FIG. 6) can be similar or identical to one of generator(s) 104 (FIG. 1), to generator 218 (FIG. 2), and/or to generator 318 (FIGS. 3 & 4); gear box 619 (FIG. 6) can be similar or identical to one of gear box(es) 108 (FIG. 1), to gear box 219 (FIG. 2), and/or to gear box 319 (FIGS. 3 & 4); gear box 620 (FIG. 6) can be similar or identical to one of gear box(es) 108 (FIG. 1), to gear box 220 (FIG. 2), and/or to gear box 320 (FIGS. 3 & 4); expansion tank 523 can be similar or identical to one of the expansion tank(s) described above with respect to system 100 (FIG. 1), to expansion tank 223 (FIG. 2), and/or to expansion tank 323 (FIGS. 3 & 4); and/or buffer tank 524 can be similar or identical to one of the buffer tank(s) described above with respect to system 100 (FIG. 1), to buffer tank 224 (FIG. 2) and/or to buffer tank 324 (FIGS. 3 & 4).

Figure 7:
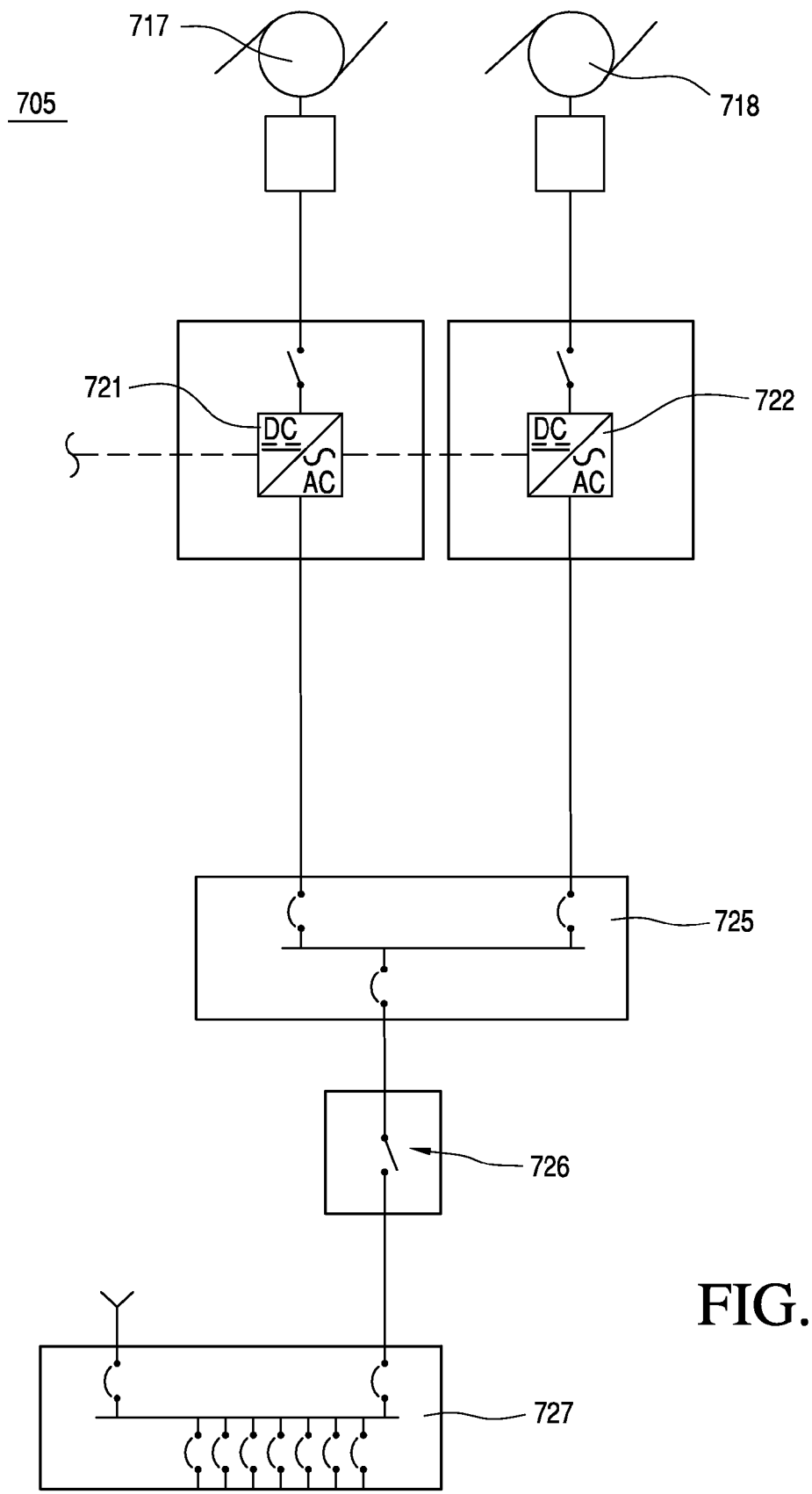
FIG. 7 illustrates a circuit diagram of an electrical system, according to an embodiment.

Turning ahead again in the drawings, FIG. 7 illustrates a circuit diagram of electrical system 705, according to an embodiment. Electrical system 705 is merely exemplary and is not limited to the embodiments presented herein. Electrical system 705 can be implemented in many different embodiments or examples not specifically depicted or described herein. Electrical system 705 can be similar or identical to electrical system 105 (FIG. 1). In various embodiments, electrical system 705 can be similar or identical to part of an electrical system of system 200 (FIG. 2), system 300 (FIGS. 3 & 4), and/or system 500 (FIGS. 5 & 6). Generally, electrical system 705 can correspond to system 200 (FIG. 2).

In many embodiments, electrical system 705 can comprise generator 717, generator 718, inverter 721, inverter 722, panel board 725, and/or disconnect 726. Similar to electrical system 105 (FIG. 1), generator 717, generator 718, inverter 721, inverter 722, panel board 725, and/or disconnect 726 can be electrically coupled together by one or more wires and/or one or more electrical components. In these or other embodiments, electrical system 705 can be electrically coupled (e.g., selectively electrically coupled) to electrical load 727 by disconnect 726. In some embodiments, electrical system 705 is devoid of an energy storage device. The energy storage device can be similar or identical to one of energy storage device(s) 109 (FIG. 1).

In these or other embodiments, generator 717 can be similar or identical to one of generator(s) 104, to generator 217 (FIG. 2), to generator 317 (FIGS. 3 & 4), and/or to generator 617 (FIG. 6); generator 718 can be similar or identical to one of generator(s) 104, to generator 218 (FIG. 2), to generator 318 (FIGS. 3 & 4), and/or to generator 618 (FIG. 6); inverter 721 can be similar or identical to one of inverter(s) 107 (FIG. 1); inverter 722 can be similar or identical to one of inverter(s) 107 (FIG. 1); panel board 725 can be similar or identical to the panel board(s) described above with respect to system 100 (FIG. 1); and/or disconnect 726 can be similar or identical to the visible-break disconnect switch described above with respect to system 100 (FIG. 1). More specifically, inverter 721 and inverter 722 each can be similar or identical to the DC to AC inverter(s) described above with respect to system 100 (FIG. 1), and electrical system 705 can be implemented so that generator 717 and inverter 721 are paired one-to-one and so that generator 718 and inverter 722 are paired one-to-one. Further, electrical load 727 can be similar or identical to one of electrical load(s) 110 (FIG. 1).

Figure 8:
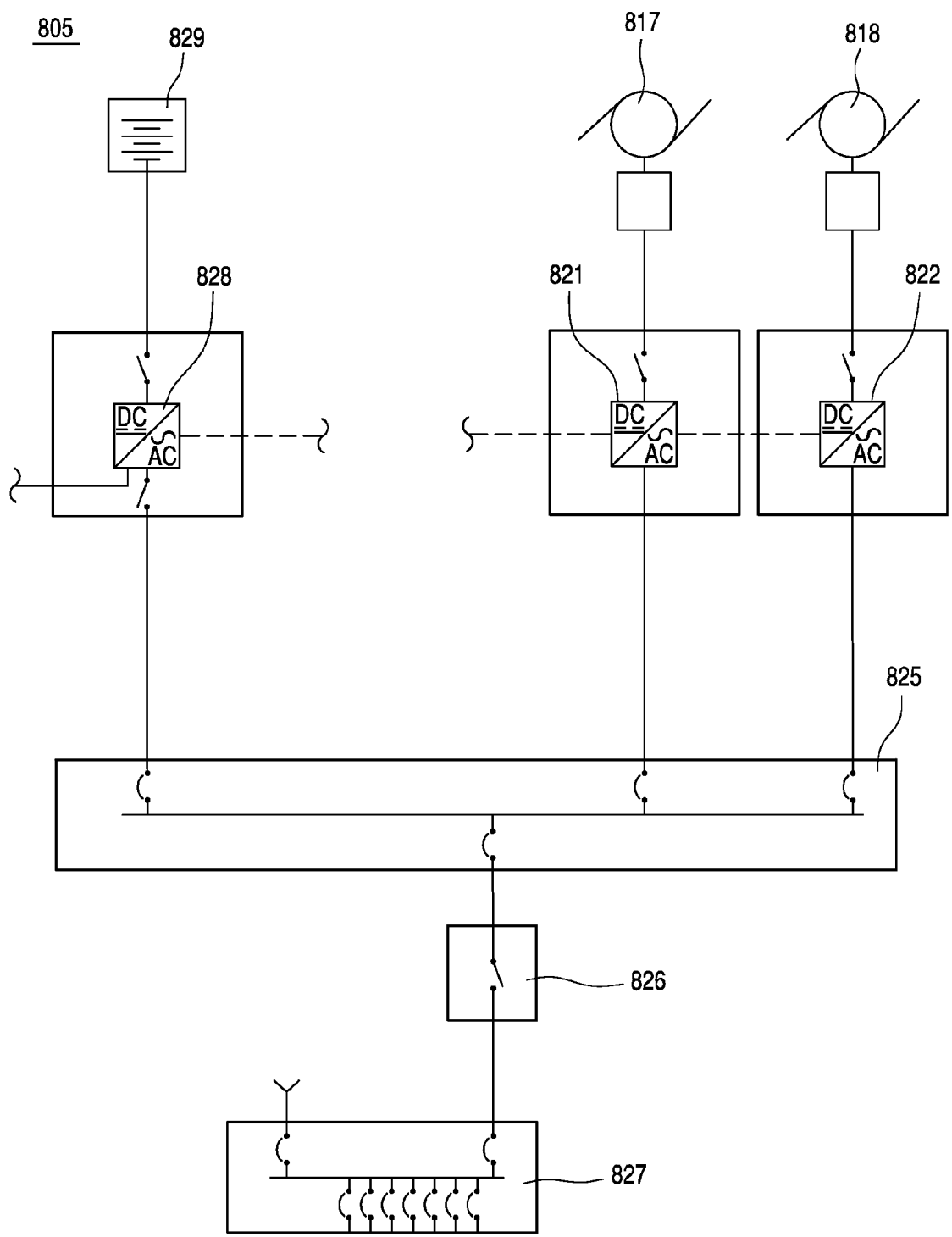
FIG. 8 illustrates a circuit diagram of an electrical system, according to an embodiment.

Turning to the next drawing, FIG. 8 illustrates a circuit diagram of electrical system 805, according to an embodiment. Electrical system 805 is merely exemplary and is not limited to the embodiments presented herein. Electrical system 805 can be implemented in many different embodiments or examples not specifically depicted or described herein. Electrical system 805 can be similar or identical to electrical system 105 (FIG. 1) and/or similar to electrical system 705 (FIG. 7). In various embodiments, electrical system 805 can be similar or identical to part of an electrical system of system 200 (FIG. 2), system 300 (FIGS. 3 & 4), and/or system 500 (FIGS. 5 & 6). Generally, electrical system 805 can correspond to system 300 (FIGS. 3 & 4).

In many embodiments, electrical system 805 can comprise generator 817, generator 818, inverter 821, inverter 822, inverter 828, panel board 825, energy storage device 829, and/or disconnect 826. Similar to electrical system 105 (FIG. 1), generator 817, generator 818, inverter 821, inverter 822, inverter 828, panel board 825, and/or disconnect 826 can be electrically coupled together by one or more wires and/or one or more electrical components. In these or other embodiments, electrical system 805 can be electrically coupled (e.g., selectively electrically coupled) to electrical load 827 by disconnect 826.

In these or other embodiments, generator 817 can be similar or identical to one of generator(s) 104, to generator 217 (FIG. 2), to generator 317 (FIGS. 3 & 4), to generator 617 (FIG. 6), and/or to generator 717 (FIG. 7); generator 818 can be similar or identical to one of generator(s) 104, to generator 218 (FIG. 2), to generator 318 (FIGS. 3 & 4), to generator 618 (FIG. 6), and/or to generator 718 (FIG. 7); inverter 821 can be similar or identical to one of inverter(s) 107 (FIG. 1) and/or to inverter 721 (FIG. 7); inverter 822 can be similar or identical to one of inverter(s) 107 (FIG. 1) and/or to inverter 722 (FIG. 7); inverter 828 can be similar or identical to one of inverter(s) 107 (FIG. 1); panel board 825 can be similar or identical to the panel board(s) described above with respect to system 100 (FIG. 1) and/or to panel board 725 (FIG. 7); energy storage device 829 can be similar or identical to energy storage device 729 (FIG. 7); and/or disconnect 826 can be similar or identical to the visible-break disconnect switch described above with respect to system 100 (FIG. 1) and/or to disconnect 726 (FIG. 7). More specifically, inverter 821 and inverter 822 each can be similar or identical to the DC to AC inverter(s) described above with respect to system 100 (FIG. 1), inverter 828 can be similar or identical to the AC to DC inverter(s) described above with respect to system 100 (FIG. 1), and electrical system 805 can be implemented so that generator 817 and inverter 821 are paired one-to-one, so that generator 818 and inverter 822 are paired one-to-one, and so that energy storage device 829 and inverter 828 are paired one-to-one. Further, electrical load 827 can be similar or identical to one of electrical load(s) 110 (FIG. 1) and/or to electrical load 727 (FIG. 7).

Figure 9:
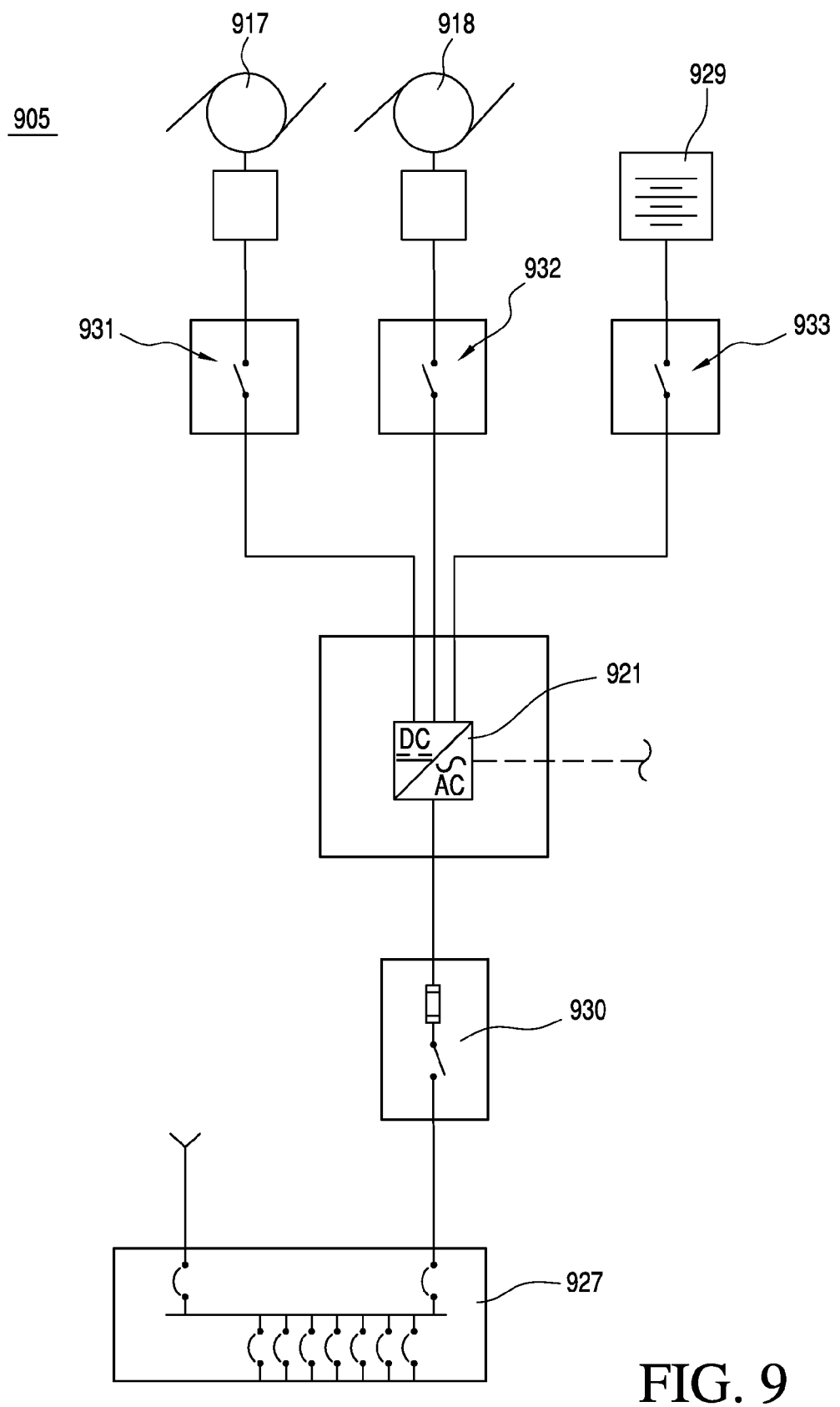
FIG. 9 illustrates a circuit diagram of an electrical system, according to an embodiment.

Turning again to the next drawing, FIG. 9 illustrates a circuit diagram of electrical system 905, according to an embodiment. Electrical system 905 is merely exemplary and is not limited to the embodiments presented herein. Electrical system 905 can be implemented in many different embodiments or examples not specifically depicted or described herein. Electrical system 905 can be similar or identical to electrical system 105 (FIG. 1), similar to electrical system 705 (FIG. 7), and/or similar to electrical system 805 (FIG. 8). In various embodiments, electrical system 905 can be similar or identical to part of an electrical system of system 200 (FIG. 2), system 300 (FIGS. 3 & 4), and/or system 500 (FIGS. 5 & 6). Generally, electrical system 805 can correspond to system 500 (FIGS. 5 & 6).

In many embodiments, electrical system 905 can comprise generator 917, generator 918, inverter 921, energy storage device 929, electrical switch 931, electrical switch 932, electrical switch 933, and/or disconnect 930. Similar to electrical system 105 (FIG. 1), generator 917, generator 918, inverter 921, energy storage device 929, electrical switch 931, electrical switch 932, electrical switch 933, and/or disconnect 930 can be electrically coupled together by one or more wires and/or one or more electrical components. In these or other embodiments, electrical system 905 can be electrically coupled (e.g., selectively electrically coupled) to electrical load 927 by disconnect 926.

In these or other embodiments, generator 917 can be similar or identical to one of generator(s) 104, to generator 217 (FIG. 2), to generator 317 (FIGS. 3 & 4), to generator 617 (FIG. 6), to generator 717 (FIG. 7), and/or to generator 817 (FIG. 8); generator 918 can be similar or identical to one of generator(s) 104, to generator 218 (FIG. 2), to generator 318 (FIGS. 3 & 4), to generator 618 (FIG. 6), to generator 718 (FIG. 7), and/or to generator 818 (FIG. 8); inverter 821 can be similar or identical to one of inverter(s) 107 (FIG. 1) and/or similar to inverter 721 (FIG. 7) and/or inverter 821 (FIG. 8); energy storage device 929 can be similar or identical to energy storage device 729 (FIG. 7) and/or to energy storage device 829 (FIG. 8); electrical switch 931, electrical switch 932, and/or electrical switch 933 each can be similar or identical to one of the electrical component(s) (e.g., electrical switch(es)) described above with respect to system 100 (FIG. 1); and/or disconnect 826 can be similar or identical to the fuse disconnect switch described above with respect to system 100 (FIG. 1). More specifically, inverter 921 can be similar or identical to the DC to AC inverter(s) described above with respect to system 100 (FIG. 1), and electrical system 805 can be implemented so that generator 917, generator 918, and energy storage device 929 are all three paired with inverter 921, as similarly described above with respect to the various exemplary arrangements of inverter(s) 107 (FIG. 1). Further, electrical load 927 can be similar or identical to one of electrical load(s) 110 (FIG. 1), to electrical load 727 (FIG. 7), and/or to electrical load 827 (FIG. 8).

Figure 11:
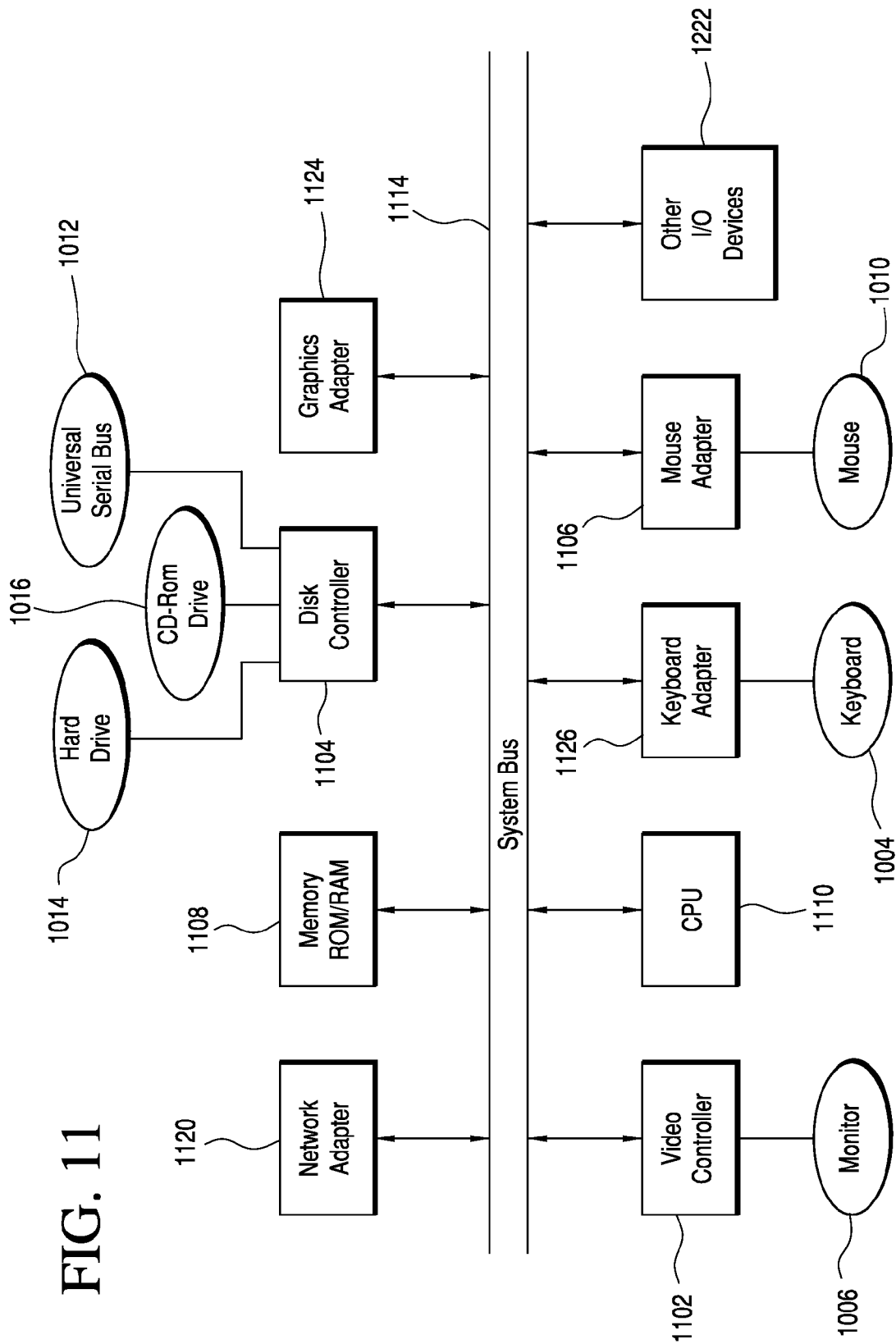
FIG. 11 illustrates a representative block diagram of exemplary elements included on the circuit boards inside a chassis of the computer system of FIG. 10.

Turning to the drawings, FIG. 10 illustrates an exemplary embodiment of a computer system 1000, all of which or a portion of which can be suitable for (i) implementing part of the systems (e.g., system 100 (FIG. 1), system 200 (FIG. 2), system 300 (FIGS. 3 & 4), and/or system 500 (FIGS. 5 & 6)) described herein. As an example, a different or separate one of a chassis 1002 (and its internal components) can be suitable for implementing part of one or more embodiments of the systems (e.g., system 100 (FIG. 1), system 200 (FIG. 2), system 300 (FIGS. 3 & 4), and/or system 500 (FIGS. 5 & 6)) described herein. Furthermore, one or more elements of computer system 1000 (e.g., a refreshing monitor 1006, a keyboard 1004, and/or a mouse 1010, etc.) can also be appropriate for implementing part of one or more embodiments of the systems (e.g., system 100 (FIG. 1), system 200 (FIG. 2), system 300 (FIGS. 3 & 4), and/or system 500 (FIGS. 5 & 6)) described herein. Computer system 1000 can comprise chassis 1002 containing one or more circuit boards (not shown), a Universal Serial Bus (USB) port 1012, a Compact Disc Read-Only Memory (CD-ROM) and/or Digital Video Disc (DVD) drive 1016, and a hard drive 1014. A representative block diagram of the elements included on the circuit boards inside chassis 1002 is shown in FIG. 11. A central processing unit (CPU) 1110 in FIG. 11 is coupled to a system bus 1114 in FIG. 11. In various embodiments, the architecture of CPU 1110 can be compliant with any of a variety of commercially distributed architecture families.

Continuing with FIG. 11, system bus 1114 also is coupled to a memory storage unit 1108, where memory storage unit 1108 can comprise (i) volatile (e.g., transitory) memory, such as, for example, read only memory (ROM) and/or (ii) non-volatile (e.g., non-transitory) memory, such as, for example, random access memory (RAM). The non-volatile memory can be removable and/or non-removable non-volatile memory. Meanwhile, RAM can include dynamic RAM (DRAM), static RAM (SRAM), etc. Further, ROM can include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. The memory storage module(s) of the various embodiments disclosed herein can comprise memory storage unit 208, an external memory storage drive (not shown), such as, for example, a USB-equipped electronic memory storage drive coupled to universal serial bus (USB) port 1012 (FIGS. 10-11), hard drive 1014 (FIGS. 10-11), CD-ROM and/or DVD drive 1016 (FIGS. 10-11), a floppy disk drive (not shown), an optical disc (not shown), a magneto-optical disc (now shown), magnetic tape (not shown), etc. Further, non-volatile or non-transitory memory storage module(s) refer to the portions of the memory storage module(s) that are non-volatile (e.g., non-transitory) memory.

In various examples, portions of the memory storage module(s) of the various embodiments disclosed herein (e.g., portions of the non-volatile memory storage module(s)) can be encoded with a boot code sequence suitable for restoring computer system 1000 (FIG. 10) to a functional state after a system reset. In addition, portions of the memory storage module(s) of the various embodiments disclosed herein (e.g., portions of the non-volatile memory storage module(s)) can comprise microcode such as a Basic Input-Output System (BIOS) operable with computer system 1000 (FIG. 10). In the same or different examples, portions of the memory storage module(s) of the various embodiments disclosed herein (e.g., portions of the non-volatile memory storage module(s)) can comprise an operating system, which can be a software program that manages the hardware and software resources of a computer and/or a computer network. The BIOS can initialize and test components of computer system 1000 (FIG. 1) and load the operating system. Meanwhile, the operating system can perform basic tasks such as, for example, controlling and allocating memory, prioritizing the processing of instructions, controlling input and output devices, facilitating networking, and managing files. Exemplary operating systems can comprise (i) Microsoft® Windows® operating system (OS) by Microsoft Corp. of Redmond, Wash., United States of America, (ii) Mac® OS by Apple Inc. of Cupertino, Calif., United States of America, (iii) UNIX® OS, and (iv) Linux® OS. Further exemplary operating systems can comprise (i) the iPhone® operating system by Apple Inc. of Cupertino, Calif., United States of America, (ii) the Blackberry® operating system by Research In Motion (RIM) of Waterloo, Ontario, Canada, (iii) the Palm® operating system by Palm, Inc. of Sunnyvale, Calif., United States, (iv) the Android™ operating system developed by the Open Handset Alliance, (v) the Windows Mobile™ operating system by Microsoft Corp. of Redmond, Wash., United States of America, or (vi) the Symbian™ operating system by Nokia Corp. of Keilaniemi, Espoo, Finland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processing modules of the various embodiments disclosed herein can comprise CPU 210.

In the depicted embodiment of FIG. 11, various I/O devices such as a disk controller 1104, a graphics adapter 1124, a video controller 1102, a keyboard adapter 1126, a mouse adapter 1106, a network adapter 1120, and other I/O devices 1122 can be coupled to system bus 1114. Keyboard adapter 1126 and mouse adapter 1106 are coupled to keyboard 1004 (FIGS. 10-11) and mouse 1010 (FIGS. 10-11), respectively, of computer system 1000 (FIG. 10). While graphics adapter 1124 and video controller 1102 are indicated as distinct units in FIG. 11, video controller 1102 can be integrated into graphics adapter 1124, or vice versa in other embodiments. Video controller 1102 is suitable for refreshing monitor 1006 (FIGS. 1-2) to display images on a screen 1008 (FIG. 1) of computer system 1000 (FIG. 1). Disk controller 1104 can control hard drive 1014 (FIGS. 1-2), USB port 1012 (FIGS. 1-2), and CD-ROM drive 1016 (FIGS. 1-2). In other embodiments, distinct units can be used to control each of these devices separately.

Network adapter 1120 can be suitable to connect computer system 1000 (FIG. 10) to a computer network by wired communication (e.g., a wired network adapter) and/or wireless communication (e.g., a wireless network adapter). In some embodiments, network adapter 1120 can be plugged or coupled to an expansion port (not shown) in computer system 1000 (FIG. 1). In other embodiments, network adapter 1120 can be built into computer system 1000 (FIG. 10). For example, network adapter 1120 can be built into computer system 1000 (FIG. 10) by being integrated into the motherboard chipset (not shown), or implemented via one or more dedicated communication chips (not shown), connected through a PCI (peripheral component interconnector) or a PCI express bus of computer system 1000 (FIG. 10) or USB port 1012 (FIG. 10).

Returning now to FIG. 10, although many other components of computer system 1000 are not shown, such components and their interconnection are well known to those of ordinary skill in the art. Accordingly, further details concerning the construction and composition of computer system 1000 and the circuit boards inside chassis 1002 are not discussed herein.

Further, although computer system 1000 is illustrated as a desktop computer in FIG. 10, there can be examples where computer system 1000 may take a different form factor while still having functional elements similar to those described for computer system 1000. In some embodiments, computer system 1000 may comprise a single computer, a single server, or a cluster or collection of computers or servers, or a cloud of computers or servers. Typically, a cluster or collection of servers can be used when the demand on computer system 1000 exceeds the reasonable capability of a single server or computer. In certain embodiments, computer system 100 may comprise a portable computer, such as a laptop computer. In certain other embodiments, computer system 1000 may comprise a mobile device, such as a smart phone. In certain additional embodiments, computer system 1000 may comprise an embedded system. In other embodiments, computer system 1000 can comprise a microcontroller, such as, for example, where the computing requirements of computer system 1000 are relatively low.

Figure 12:
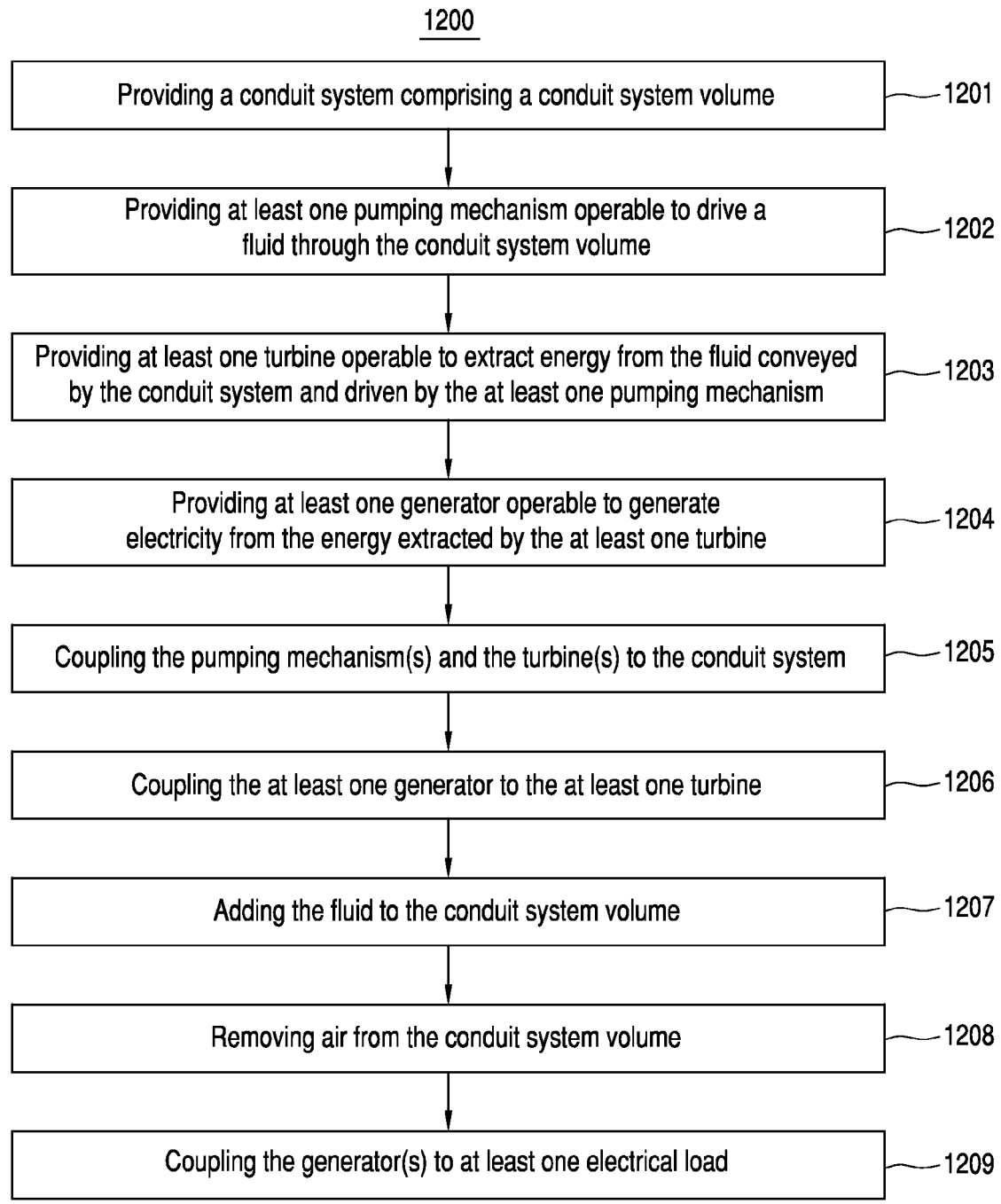
FIG. 12 illustrates a flow chart for an embodiment of a method of manufacturing a system.

Turning ahead again in the drawings, FIG. 12 illustrates a flow chart for an embodiment of method 1200 of manufacturing a system. Method 1200 is merely exemplary and is not limited to the embodiments presented herein. Method 1200 can be employed in many different embodiments or examples not specifically depicted or described herein. In some embodiments, the activities of method 1200 can be performed in the order presented. In other embodiments, the activities of method 1200 can be performed in any other suitable order. In still other embodiments, one or more of the activities in method 1200 can be combined or skipped. In many embodiments, the system of method 1200 can be similar or identical to system 100 (FIG. 1), system 200 (FIG. 2), system 300 (FIGS. 3 & 4), and/or system 500 (FIGS. 5 & 6).

In many embodiments, method 1200 can comprise activity 1201 of providing a conduit system comprising a conduit system volume. The conduit system can be similar or identical to conduit system 101 (FIG. 1), conduit system 201 (FIG. 2), conduit system 301 (FIGS. 3 & 4), and/or conduit system 501 (FIGS. 5 & 6). Meanwhile, the conduit system volume can be similar or identical to conduit system volume 106 (FIG. 1).

In many embodiments, method 1200 can comprise activity 1202 of providing at least one pumping mechanism operable to drive a fluid through the conduit system volume. The pumping mechanism(s) can be similar or identical to pumping mechanism(s) 102 (FIG. 1), to pumping mechanism 214 (FIG. 2), to pumping mechanism 314 (FIGS. 3 & 4), and/or to pumping mechanism 514 (FIGS. 5 & 6). Further, the fluid can be similar or identical to the fluid described above with respect to system 100 (FIG. 1).

In many embodiments, method 1200 can comprise activity 1203 of providing at least one turbine operable to extract energy from the fluid conveyed by the conduit system and driven by the at least one pumping mechanism. The turbine(s) can be similar or identical to turbine(s) 103 (FIG. 1), to turbine 215 (FIG. 2) and/or turbine 216 (FIG. 2), to turbine 315 (FIGS. 3 & 4) and/or turbine 316 (FIGS. 3 & 4), and/or to turbine 515 (FIGS. 5 & 6) and/or turbine 516 (FIGS. 5 & 6).

In many embodiments, method 1200 can comprise activity 1204 of providing at least one generator operable to generate electricity from the energy extracted by the at least one turbine. The generator(s) can be similar or identical to generator(s) 104 (FIG. 1), to generator 217 (FIG. 2) and/or generator 218 (FIG. 2), to generator 317 (FIGS. 3 & 4) and/or generator 318 (FIGS. 3 & 4), and/or to generator 617 (FIG. 6) and/or generator 618 (FIG. 6). In various embodiments, activities 1201-1204 can be performed serially (in any order) or approximately simultaneously.

In many embodiments, method 1200 can comprise activity 1205 of coupling the pumping mechanics(s) and the turbine(s) to the conduit system. In these embodiments, activity 1205 can be performed after performing activities 1201-1203.

In many embodiments, method 1200 can comprise activity 1206 of coupling the at least one generator to the at least one turbine. In these embodiments, activity 1206 can be performed after performing activity 1203 and activity 1204.

In some embodiments, method 1200 can comprise activity 1207 of adding the fluid to the conduit system volume; and/or method 1200 can comprise activity 1208 of removing air from the conduit system volume. Activity 1207 and/or activity 1208 can be performed after activities 1201-1203.

Further, method 1200 can comprise activity 1209 of coupling the generator(s) to at least one electrical load. The electrical load(s) can be similar or identical to electrical load(s) 110 (FIG. 1), electrical load 727 (FIG. 7), electrical load 827 (FIG. 8), and/or electrical load 927 (FIG. 9).

Although the invention has been described with reference to specific embodiments, it will be understood by those skilled in the art that various changes may be made without departing from the spirit or scope of the invention. Accordingly, the disclosure of embodiments of the invention is intended to be illustrative of the scope of the invention and is not intended to be limiting. It is intended that the scope of the invention shall be limited only to the extent required by the appended claims. For example, to one of ordinary skill in the art, it will be readily apparent that one or more activities of method 1200 (FIG. 12) may be comprised of many different activities, be performed by many different modules and/or in many different orders, that any element of FIGS. 1-12 may be modified and that the foregoing discussion of certain of these embodiments does not necessarily represent a complete description of all possible embodiments.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
   a conduit system comprising a conduit system volume, the conduit system being configured to convey a fluid through the conduit system volume of the conduit system;
   at least one pumping mechanism operable to drive the fluid through the conduit system volume;
   at least one turbine operable to extract energy from the fluid conveyed by the conduit system and driven by the at least one pumping mechanism; and
   at least one generator coupled to the at least one turbine and operable to generate first electricity from the energy extracted by the at least one turbine;
   wherein:
   the at least one pumping mechanism is powered by second electricity other than the first electricity when the at least one generator generates the first electricity from the energy extracted by the at least one turbine, and the second electricity originates from an electricity source external from the system;
   the conduit system is configured to seal the fluid in the conduit system volume so that the fluid is entirely isolated from an atmosphere ambient to the system and so that all of the conduit system volume is pressurized to an operating pressure greater than an atmospheric pressure of the atmosphere ambient to the system; and
   the at least one pumping mechanism is operable to drive the fluid through the conduit system and the at least one turbine is operable to extract the energy from the fluid when the fluid is sealed in the conduit system volume and when the conduit system volume is pressurized to the operating pressure.

2. The system of claim 1 wherein:
the fluid comprises liquid water.

3. The system of claim 1 wherein:
when the fluid is being driven through the conduit system volume by the least one pumping mechanism, the fluid comprises a hydraulic head having a static head component of approximately zero meters.

4. The system of claim 1 wherein:
the conduit system is configured to cycle the fluid driven by the least one pumping mechanism so that the fluid output by the at least one turbine is returned to the at least one pumping mechanism.

5. The system of claim 1 wherein:
the operating pressure exceeds the atmospheric pressure by at least approximately 0.034 megapascals.

6. The system of claim 1 further comprising:
at least one inverter configured to convert an electric current of the first electricity from direct current to alternating current.

7. The system of claim 1 wherein:
the system is configured to make available one or more parts of the first electricity to one or more electrical loads.

8. The system of claim 7 wherein:
the one or more electrical loads comprise at least one electrical grid.

9. The system of claim 7 wherein:
the one or more electrical loads comprise at least one of a structural electrical load or a vehicular electrical load.

10. The system of claim 7 further comprising:
at least one energy storage device configured to store at least one of the one or more parts of the first electricity as stored energy, the one or more electrical loads comprising the at least one energy storage device.

11. The system of claim 10 wherein:
the at least one energy storage device comprises at least one battery.

12. The system of claim 1 wherein:
the at least one turbine comprises at least two turbines arranged in series to each other.

13. The system of claim 1 wherein:
the at least one turbine comprises at least two turbines arranged in parallel to each other.

14. The system of claim 1 further comprising:
a gear box mechanism;
wherein:
 the at least one turbine comprises a first turbine;
 the at least one generator comprises a first generator;
 the gear box mechanism is operable to limit a voltage of the first electricity; and
 the gear box mechanism is coupled between the first turbine and the first generator in order to limit the voltage of the first electricity.

15. A system comprising:
a conduit system comprising a conduit system volume, the conduit system being configured to convey a fluid through the conduit system volume of the conduit system;
at least one pumping mechanism operable to drive the fluid through the conduit system volume;
at least one turbine operable to extract energy from the fluid conveyed by the conduit system and driven by the at least one pumping mechanism;
at least one generator coupled to the at least one turbine and operable to generate first electricity from the energy extracted by the at least one turbine; and
a gear box mechanism;
wherein:
 the at least one pumping mechanism is powered by second electricity other than the first electricity when the at least one generator generates the first electricity from the energy extracted by the at least one turbine, and the second electricity originates from an electricity source external from the system;
 the conduit system is configured such that the conduit system volume is able to be isolated from an atmosphere ambient to the system so as to seal the fluid in the conduit system volume and so that the conduit system volume is pressurized to an operating pressure greater than an atmospheric pressure of the atmosphere ambient to the system;
 the at least one pumping mechanism is operable to drive the fluid through the conduit system and the at least one turbine is operable to extract the energy from the fluid when the fluid is sealed in the conduit system volume and when the conduit system volume is pressurized to the operating pressure;
 the fluid comprises liquid water;
 the conduit system is configured to cycle the fluid driven by at least one pumping mechanism so that the fluid output by the at least one turbine is returned to the at least one pumping mechanism;
 the system is configured to make available one or more parts of the first electricity to one or more electrical loads; and
 the at least one turbine comprises a first turbine;
 the at least one generator comprises a first generator;
 the gear box mechanism is operable to limit a voltage of the first electricity by regulating a rotational speed of the first generator; and
 the gear box mechanism is coupled between the first turbine and the first generator.

16. The system of claim 15 wherein:
the one or more electrical loads comprise at least one of:
 at least one electrical grid; or
 at least one energy storage device configured to store at least one of the one or more parts of the first electricity as stored energy, the system further comprising the at least one energy storage device.

17. The system of claim 16 wherein:
when the fluid is being driven through the conduit system volume by the least one pumping mechanism, the fluid comprises a hydraulic head having a static head component of approximately zero meters; and
the operating pressure exceeds the atmospheric pressure by at least approximately 0.034 megapascals.

18. A method of manufacturing a system, the method comprising:
providing a conduit system comprising a conduit system volume, the conduit system being configured to convey a fluid through the conduit system volume of the conduit system;
providing at least one pumping mechanism operable to drive the fluid through the conduit system volume;
providing at least one turbine operable to extract energy from the fluid conveyed by the conduit system and driven by the at least one pumping mechanism;
providing at least one generator operable to generate first electricity from the energy extracted by the at least one turbine;
coupling the at least one pumping mechanism and the at least one turbine to the conduit system; and
coupling the at least one generator to the at least one turbine;
wherein:
 the system comprises the conduit system, the at least one pumping mechanism, the at least one turbine, and the at least one generator;
 the at least one pumping mechanism is powered by second electricity other than the first electricity when the at least one generator generates the first electricity from the energy extracted by the at least one turbine, and the second electricity originates from an electricity source external from the system;
 the conduit system is configured to seal the fluid in the conduit system volume so that the fluid is entirely isolated from an atmosphere ambient to the system and so that all of the conduit system volume is pressurized to an operating pressure greater than an atmospheric pressure of the atmosphere ambient to the system; and
 the at least one pumping mechanism is operable to drive the fluid through the conduit system and the at least one turbine is operable to extract the energy from the fluid when the fluid is sealed in the conduit system volume and when the conduit system volume is pressurized to the operating pressure.

19. The method of claim 18 further comprising:
adding the fluid to the conduit system volume; and
removing air from the conduit system volume.

20. The method of claim 18 further comprising:
coupling the at least one generator to at least one electrical load.

* * * * *